(12) United States Patent
Smith

(10) Patent No.: US 7,710,957 B2
(45) Date of Patent: May 4, 2010

(54) SYSTEM AND METHOD FOR IMPLEMENTING MULTIPLE SPANNING TREES PER NETWORK

(75) Inventor: Michael R. Smith, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 1039 days.

(21) Appl. No.: 10/858,088

(22) Filed: Jun. 1, 2004

(65) Prior Publication Data

US 2005/0259649 A1    Nov. 24, 2005

Related U.S. Application Data

(63) Continuation of application No. 10/848,896, filed on May 19, 2004.

(51) Int. Cl.
*H04L 12/56* (2006.01)

(52) U.S. Cl. ........................... 370/389; 370/256

(58) Field of Classification Search ............ 370/256, 370/389, 254, 400, 411, 401
See application file for complete search history.

(56) References Cited

U.S. PATENT DOCUMENTS

| | | | | |
|---|---|---|---|---|
| 4,387,371 A | | 6/1983 | Beker et al. ............ 340/825.52 |
| 5,058,110 A | | 10/1991 | Beach et al. ................. 370/464 |
| 5,371,852 A | * | 12/1994 | Attanasio et al. ............ 709/245 |
| 5,473,599 A | | 12/1995 | Li et al. ........................ 370/16 |
| 5,822,512 A | | 10/1998 | Goodrum et al. ....... 395/182.11 |
| 5,825,772 A | * | 10/1998 | Dobbins et al. ............. 370/396 |
| 5,959,968 A | | 9/1999 | Chin et al. ................... 370/216 |
| 5,959,972 A | | 9/1999 | Hamami ...................... 370/228 |
| 5,959,989 A | | 9/1999 | Gleeson et al. ............. 370/390 |
| 5,978,852 A | | 11/1999 | Myrick et al. ............... 709/238 |
| 6,032,194 A | | 2/2000 | Gai et al. ..................... 709/239 |
| 6,064,671 A | | 5/2000 | Killian ........................ 370/389 |
| 6,085,238 A | | 7/2000 | Yuasa et al. ................. 709/223 |
| 6,108,300 A | | 8/2000 | Coile et al. ................. 370/217 |
| 6,163,543 A | | 12/2000 | Chin et al. ................... 370/400 |
| 6,181,681 B1 | | 1/2001 | Hiscock et al. ............. 370/279 |

(Continued)

FOREIGN PATENT DOCUMENTS

CN    1407762 A    4/2003

(Continued)

OTHER PUBLICATIONS

Michael R. Smith, Jeffrey YM Wang, Ali Golshan; "Interface Bundles in Virtual Network Devices;" U.S. Appl. No. 10/782,314, filed Feb. 19, 2004; 42 pages of Specification (including claims & abstract); and 13 sheets of drawings.

(Continued)

*Primary Examiner*—Ricky Ngo
*Assistant Examiner*—Gary Mui
(74) *Attorney, Agent, or Firm*—Campbell Stephenson LLP

(57) ABSTRACT

Several different spanning trees are calculated for a network. The network has several different ingress points via which packets can enter the network. Each of the spanning trees is associated with (at least) one of the ingress points, such that different spanning trees are associated with different ingress points. Packets that enter the network via a particular ingress point are forwarded through the network according to the spanning tree associated with that particular ingress point.

45 Claims, 14 Drawing Sheets

U.S. PATENT DOCUMENTS

| | | | |
|---|---|---|---|
| 6,181,699 B1 | 1/2001 | Crinion et al. | 370/392 |
| 6,195,351 B1 | 2/2001 | Hiscock et al. | 370/389 |
| 6,202,114 B1 | 3/2001 | Dutt et al. | 710/311 |
| 6,222,820 B1 | 4/2001 | Hamami | 370/218 |
| 6,236,659 B1 | 5/2001 | Pascoe | 370/404 |
| 6,243,360 B1 | 6/2001 | Basilico | 370/231 |
| 6,275,953 B1 | 8/2001 | Vahalia et al. | 714/11 |
| 6,298,061 B1 | 10/2001 | Chin et al. | 370/400 |
| 6,377,992 B1 | 4/2002 | Fernandez et al. | 709/227 |
| 6,388,995 B1 | 5/2002 | Gai et al. | 370/256 |
| 6,421,787 B1 | 7/2002 | Slaughter et al. | 714/4 |
| 6,460,088 B1* | 10/2002 | Merchant | 709/236 |
| 6,487,591 B1 | 11/2002 | Budhraja et al. | 709/223 |
| 6,519,231 B1 | 2/2003 | Ding et al. | 370/256 |
| 6,535,490 B1 | 3/2003 | Jain | 370/256 |
| 6,535,491 B2 | 3/2003 | Gai et al. | 370/256 |
| 6,567,403 B1 | 5/2003 | Congdon et al. | 370/389 |
| 6,657,973 B1* | 12/2003 | Arima | 370/254 |
| 6,658,016 B1 | 12/2003 | Dai et al. | 370/424 |
| 6,674,713 B1 | 1/2004 | Berg et al. | 370/219 |
| 6,690,668 B1 | 2/2004 | Szczepanek et al. | 370/392 |
| 6,697,339 B1 | 2/2004 | Jain | 370/256 |
| 6,728,780 B1 | 4/2004 | Hebert | 709/239 |
| 6,735,198 B1 | 5/2004 | Edsall et al. | 370/389 |
| 6,735,205 B1 | 5/2004 | Mankude et al. | 370/395.32 |
| 6,738,345 B1 | 5/2004 | Williamson | 370/217 |
| 6,760,776 B1 | 7/2004 | Gallo et al. | 709/238 |
| 6,804,721 B2* | 10/2004 | Wils et al. | 709/230 |
| 6,810,421 B1 | 10/2004 | Ishizaki et al. | 709/226 |
| 6,816,467 B1* | 11/2004 | Muller et al. | 370/256 |
| 6,856,591 B1* | 2/2005 | Ma et al. | 370/216 |
| 6,938,095 B2 | 8/2005 | Basturk et al. | 709/238 |
| 6,980,534 B1* | 12/2005 | Nee et al. | 370/329 |
| 7,061,858 B1 | 6/2006 | Di Benedetto et al. | 370/219 |
| 7,061,875 B1 | 6/2006 | Portolani et al. | 370/256 |
| 7,126,923 B1* | 10/2006 | Yang et al. | 370/256 |
| 7,127,633 B1 | 10/2006 | Olson et al. | 714/4 |
| 7,130,305 B2* | 10/2006 | Kuukankorpi et al. | 370/392 |
| 7,178,052 B2 | 2/2007 | Hebbar et al. | 714/4 |
| 7,286,853 B2 | 10/2007 | Meier | 455/560 |
| 2001/0014097 A1* | 8/2001 | Beck et al. | 370/401 |
| 2002/0018489 A1* | 2/2002 | Ambe et al. | 370/475 |
| 2002/0080720 A1 | 6/2002 | Pegrum et al. | 370/236 |
| 2002/0089978 A1 | 7/2002 | Wang et al. | 370/389 |
| 2002/0091755 A1 | 7/2002 | Narin | 709/203 |
| 2002/0103921 A1* | 8/2002 | Nair et al. | 709/232 |
| 2002/0110148 A1 | 8/2002 | Hickman et al. | 370/475 |
| 2002/0126671 A1 | 9/2002 | Ellis et al. | 370/390 |
| 2002/0146008 A1* | 10/2002 | Kaplan | 370/390 |
| 2002/0156612 A1 | 10/2002 | Schulter et al. | 703/23 |
| 2002/0165981 A1 | 11/2002 | Basturk et al. | 709/242 |
| 2002/0176450 A1 | 11/2002 | Kong et al. | 370/539 |
| 2002/0184387 A1 | 12/2002 | Yamaya et al. | 709/238 |
| 2002/0186654 A1 | 12/2002 | Tornar | 370/225 |
| 2002/0188711 A1 | 12/2002 | Meyer et al. | 709/223 |
| 2003/0007489 A1 | 1/2003 | Krishnan et al. | 370/392 |
| 2003/0026248 A1 | 2/2003 | Hiroki | 370/352 |
| 2003/0037165 A1 | 2/2003 | Shinomiya | 709/238 |
| 2003/0051061 A1 | 3/2003 | Hank et al. | 709/250 |
| 2003/0061533 A1 | 3/2003 | Perloff et al. | 714/9 |
| 2003/0093557 A1 | 5/2003 | Giraud et al. | 709/239 |
| 2003/0097470 A1 | 5/2003 | Lapuh et al. | 709/239 |
| 2003/0110344 A1 | 6/2003 | Szczepanek et al. | 711/100 |
| 2003/0142680 A1 | 7/2003 | Oguchi | 370/400 |
| 2003/0152101 A1 | 8/2003 | Feng | 370/445 |
| 2003/0169734 A1 | 9/2003 | Lu et al. | 370/386 |
| 2003/0172147 A1 | 9/2003 | Chang et al. | 709/223 |
| 2003/0198231 A1 | 10/2003 | Kalkunte et al. | 370/395.31 |
| 2004/0057469 A1 | 3/2004 | Nuss et al. | 370/535 |
| 2004/0066781 A1 | 4/2004 | Shankar et al. | 370/389 |
| 2004/0078621 A1 | 4/2004 | Talaugon et al. | 714/4 |
| 2004/0098501 A1 | 5/2004 | Finn | 709/236 |
| 2004/0105390 A1 | 6/2004 | Saksio | 370/245 |
| 2004/0156390 A1 | 8/2004 | Prasad et al. | 370/466 |
| 2004/0208116 A1* | 10/2004 | Saint Etienne et al. | 370/216 |
| 2005/0036488 A1 | 2/2005 | Kalkunte et al. | 370/389 |
| 2005/0041665 A1 | 2/2005 | Weyman et al. | 370/390 |
| 2005/0044186 A1 | 2/2005 | Petrisor | 709/219 |
| 2005/0083933 A1 | 4/2005 | Fine et al. | 370/390 |
| 2005/0111483 A1* | 5/2005 | Cripe et al. | 370/463 |
| 2005/0169311 A1 | 8/2005 | Millet et al. | 370/471 |
| 2005/0243826 A1 | 11/2005 | Smith et al. | 370/392 |
| 2005/0259646 A1 | 11/2005 | Smith et al. | 370/389 |
| 2005/0265346 A1 | 12/2005 | Ho et al. | 370/392 |
| 2006/0015643 A1 | 1/2006 | Orava et al. | 709/238 |
| 2006/0215679 A1 | 9/2006 | Musoll et al. | 370/412 |
| 2007/0159971 A1 | 7/2007 | Zhang et al. | 370/230 |
| 2007/0180266 A1 | 8/2007 | Kang et al. | 713/189 |

FOREIGN PATENT DOCUMENTS

| | | |
|---|---|---|
| EP | 1 035 685 A2 | 9/2000 |
| EP | 1 309 135 A1 | 5/2003 |
| EP | 1 401 147 | 3/2004 |
| GB | 2 362 538 | 5/2000 |
| WO | WO 00/72531 | 11/2000 |
| WO | WO 00/78004 | 12/2000 |
| WO | WO 02/01413 | 5/2001 |
| WO | WO 02/18965 | 3/2002 |
| WO | WO 03/081451 | 10/2003 |

OTHER PUBLICATIONS

Michael R. Smith, Ali Golshan, Jeffrey YM Wang, Neelima Mehta, Venkatesh Janakiraman; "Virtual Network Device;" U.S. Appl. No. 10/666,306, filed Sep. 18, 2003; 35 pages of Specification (including claims & abstract); and 8 sheets of drawings.

News Release: "Cisco Raises the Bar in Stackable Switching, Introduces Catalyst 3750 Series with Cisco StackWise™ Technology;" 3 pages; http://newsroom.cisco.com/dlls/prod_041503b.html.

Cisco Catalyst 3750 Series Switches: "Cisco StackWise Technology White Paper;" 8 pages; http://www.cisco.com/en/US/products/hw/switches/ps5023/products_white_paper09186a00801b096a.shtml (Catalyst 3750 announced on Apr. 15, 2003, see AJ).

Michael Ward; "802.1S Solves Architecture Issues;" *Network World*, Aug. 4, 2003; 3 pages; http://www.nwfusion.com/cgi-bin/mailto/x.cgi.

D.T. Stott, "Layer-2 Path Discovery Using Spanning Tree MIBs", Avaya Labs Research, Avaya, Inc., Mar. 7, 2002, pp. 1-23.

International Search Report as mailed from the PCT on Mar. 18, 2005, for International Application No. PCT/US2004/034851, 2 pages.

Michael R. Smith, Jeffrey YM Wang, Ali Golshan; "Port-Based Loadsharing for a Satellite Switch;" U.S. Appl. No. 10/690,348, filed Oct. 21, 2003; 47 pages of Specification & 11 sheets of drawings.

Hewlett Packard, "LAN Aggregation Through Switch Meshing," XP-002284715, Jun. 1998, URL:http://www.hp.com/rnd/library/pdf/techlib_meshing.pdf [retrieved on Jun. 16, 2004], 12 pages.

Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654, ISBN 0-7803-5258-0, Feb. 10, 1999, pp. 461-468.

Nortel Networks, "Split Multi-link Trunking," http://www.nortelnetworks.com/corporate/technology/smlt/, pp. 1-2 (printed Jul. 17, 2003).

Nortel Networks, "Split Multi-link Trunking FAQs," http://www.nortelnetworks.com/corporate/technology/smlt/faq.html, pp. 1-3 (printed on Oct. 21, 2003).

Knight, S. et al. Virtual Router Redundancy Protocol, IETF, Apr. 1998, 27 pages.

International Search Report dated Aug. 2, 2005, from related International Application No. PCT/US2004/029554, 6 pages.

Written Opinion of the International Searching Authority dated Aug. 2, 2005 from related International Application No. PCT/US2004/029554, 5 pages.

International Search Report dated Jan. 14, 2005 from corresponding International Application No. PCT/US2004/029553, 4 pages.

Written Opinion of the International Searching Authority dated Jan. 14, 2005 from corresponding International Application No. PCT/US2004/029553, 6 pages.

CIPO Examination Report in related Canadian Patent Application No. 2,534,511 dated May 1, 2006, 4 pages.

Cisco Systems, Inc.: Copyright 1989-1997, http://www.cisco.com/univercd/cc/td/doc/product/rtrmgmt/sw_ntman/cwsimain/cwsi2/cwsiug2/vlan2/stpapp.htm; "Understanding Spanning-Tree Protocol," Appendix C, pp. C-1 through C-12.

Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.

Liu, Dake, et al, *Configuration-Based Architecture for High Speed and General-Purpose Protocol Processing*, Signal Processing Systems, IEEE, Oct. 20, 1999, pp. 540-547.

* cited by examiner

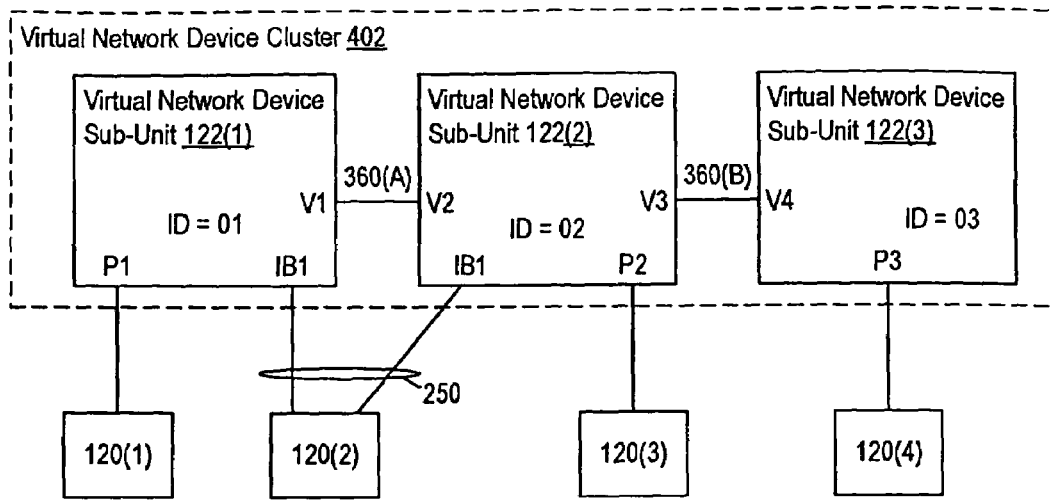
FIG. 6A
| Interface | Ingress ID Setting (if Ingress ID not already set) | Egress Filter |
|---|---|---|
| P1 | 01 | Allow 00, 01, 02, 03 |
| P2 | 02 | Allow 00, 01, 02, 03 |
| P3 | 03 | Allow 00, 01, 02, 03 |
| IB1 (of 122(1)) | 01 | Allow 00, 01 |
| IB1 (of 122(2)) | 02 | Allow 00, 02, 03 |
| V1 | 02 | Allow 00, 01 |
| V2 | 01 | Allow 00, 02, 03 |
| V3 | 03 | Allow 00, 01, 02 |
| V4 | 02 | Allow 00, 03 |
FIG. 6B
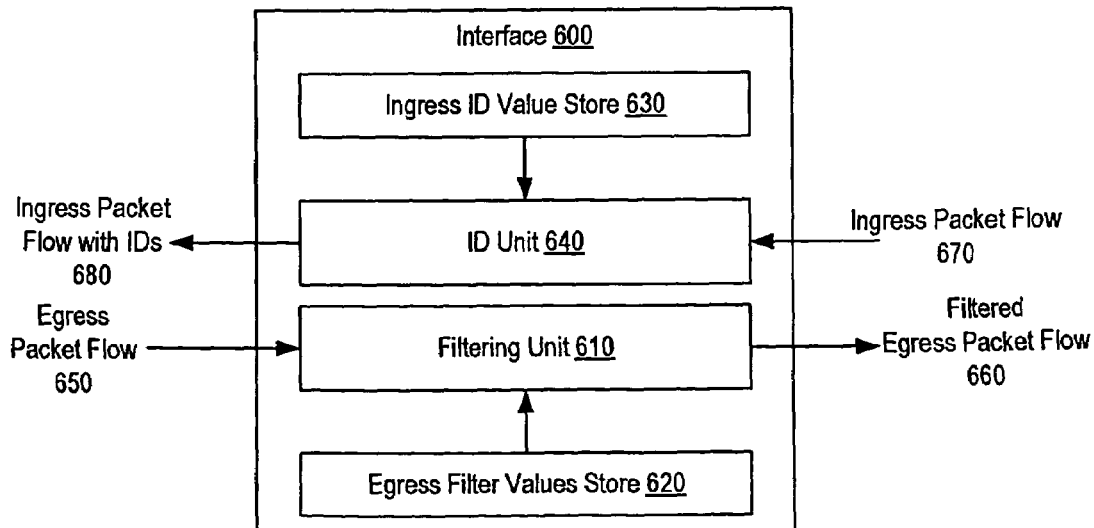
FIG. 6C

SYSTEM AND METHOD FOR IMPLEMENTING MULTIPLE SPANNING TREES PER NETWORK

This application is a continuation of U.S. patent application Ser. No. 10/848,896, entitled "Virtual Network Device Clusters," filed May 19, 2004, and naming Michael R. Smith, Sitaram Dontu, and Faisal Mushtaq as inventor(s).

BACKGROUND OF THE INVENTION

1. Field of the Invention

The present invention relates to networking and, more specifically, to virtual network devices.

2. Description of the Related Art

In order to provide increased network reliability, redundant switches and links are often included in a network. If a switch or link fails, a redundant switch or link, already in place within the network, can quickly be enabled to replace the failed switch or link. Since the redundant switch or link can typically be enabled as a replacement more quickly than the failed component can be replaced or repaired, having redundant links and/or switching provides a more reliable network.

When redundant components are included within a network, it is often desirable to be able to use the redundant components during normal network operation, before the failure of corresponding components. For example, if two links are implemented between a pair of switches, it is desirable to use both links (as opposed to leaving one link idle) to provide increased bandwidth. However, if multiple redundant links are active at the same time, management of those links may be undesirably complicated (e.g., due to the need to avoid bridging loops). This complexity extends to other situations in which multiple redundant components are used during normal operation. For example, if multiple redundant routers are simultaneously used in a network, management of the network may become more complicated due to the need to have a different point of management for each network device. As these examples show, it is desirable to be able to reduce the complexities that arise when multiple redundant components are used within a network.

SUMMARY OF THE INVENTION

Several different spanning trees are calculated for a network. The network has several different ingress points via which packets can enter the network. Each of the spanning trees is associated with (at least) one of the ingress points, such that different spanning trees are associated with different ingress points. Packets that enter the network via a particular ingress point are forwarded through the network according to the spanning tree associated with that particular ingress point.

In one embodiment, a method involves sending a first packet through a network. The first packet is sent through the network in a manner that is consistent with a first spanning tree if the first packet entered the network via a first ingress point. If instead the first packet entered the network via a second ingress point, the packet is sent through the network in a manner that is consistent with a second spanning tree. Each of several spanning trees is associated with a respective one of several ingress points, so that packets received via different ones of the ingress points are sent through the network according to different ones of the spanning trees.

A primary network device within the network can calculate the different spanning trees used within the network. The primary network device maintains information identifying the topology of the network and accesses this information when calculating the spanning trees. The primary network device provides information (e.g., such as egress filter settings) that is consistent with the spanning trees to several secondary network devices included within the network.

When the packet enters the network, the packet is associated with an identifier (e.g., by appending a header, which includes the identifier, to the packet). The identifier identifies the ingress point via which the packet entered the network. The identifier is used to identify the packet's ingress point as the packet is sent through the network.

In another embodiment, a method involves forwarding a packet to a first interface; outputting the packet from the first interface, if the packet entered a network via a first ingress point; and filtering the packet from a packet flow being output via the first interface, if the packet entered the network via a second ingress point. The first interface is not blocked by a first spanning tree, but is blocked by a second spanning tree. The first spanning tree is associated with the first ingress point, and the second spanning tree is associated with the second ingress point.

In some embodiments, a system includes several network devices, including a first network device and a second network device. The first network device is a first ingress point into a network, and the second network device is a second ingress point into the network. The first network device is associated with a first spanning tree, while the second network device is associated with a second spanning tree. The network devices are configured to send packets that enter the network via the first ingress point according to the first spanning tree, and to send packets that enter the network via the second ingress point according to the second spanning tree.

In one embodiment, an interface of a network device includes a filtering unit and an egress filter values store. The egress filter values store includes several egress filter values. Each of the egress filter values identifies whether the interface is blocked by a respective one of several spanning trees. The filtering unit is configured to access an identifier associated with a packet in order to determine whether the packet entered the network via a particular ingress point. The egress filter values identify whether the interface is blocked by a spanning tree associated with that particular ingress point.

The interface also includes an identifier unit and an identifier value store. The identifier value store stores a value identifying a first network device, which presents an ingress point into the network. The identifier unit is configured to include the value in a header appended to a packet, in response to the interface receiving the packet.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 6A shows an example of a virtual network device cluster, according to one embodiment of the present invention.

FIG. 6B shows examples of ingress ID settings and egress filter values used for each interface of the virtual network device cluster of FIG. 6A.

FIG. 6C shows an interface of a virtual network device sub-unit, according to one embodiment of the present invention.

Figure 1:
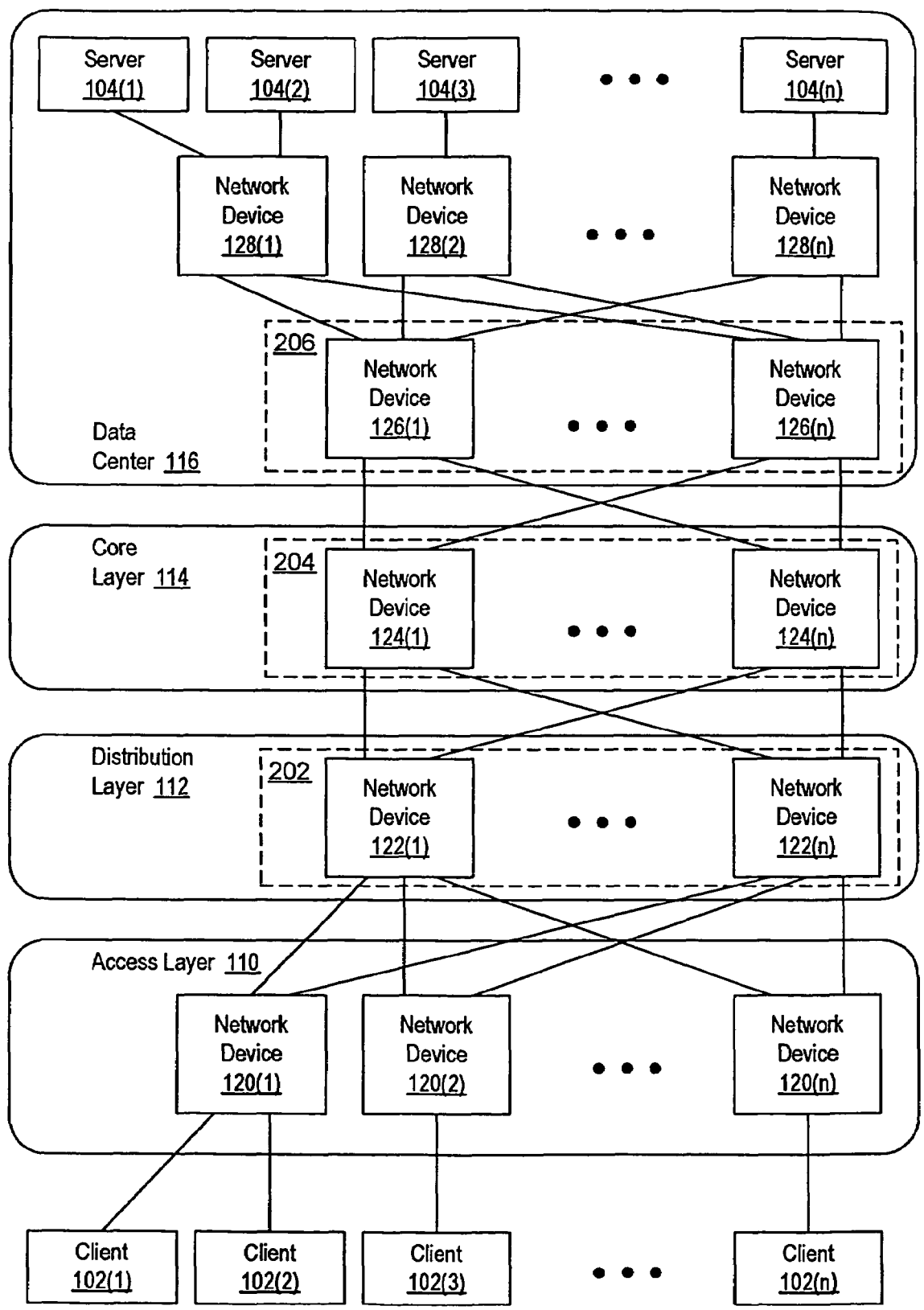
FIG. 1 is a block diagram of a network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 2A:
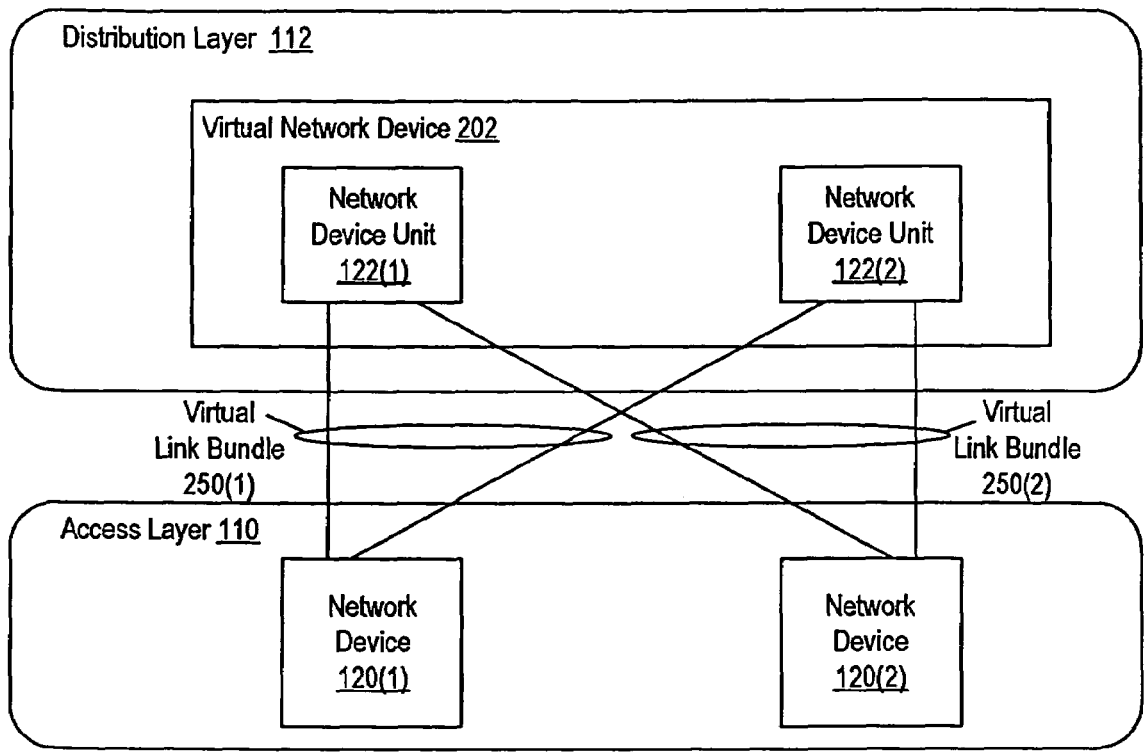
FIG. 2A and 2B show how two network devices in the same network layer collectively operate as a single virtual network device, according to one embodiment of the present invention.
Figure 2B:
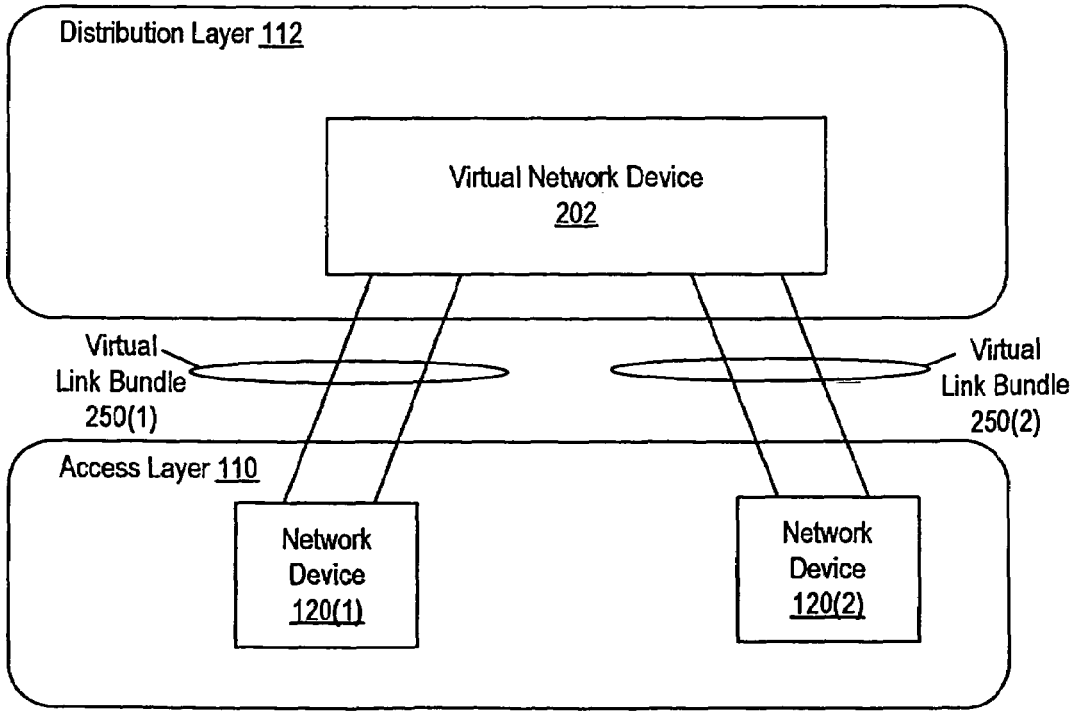
Figure 3:
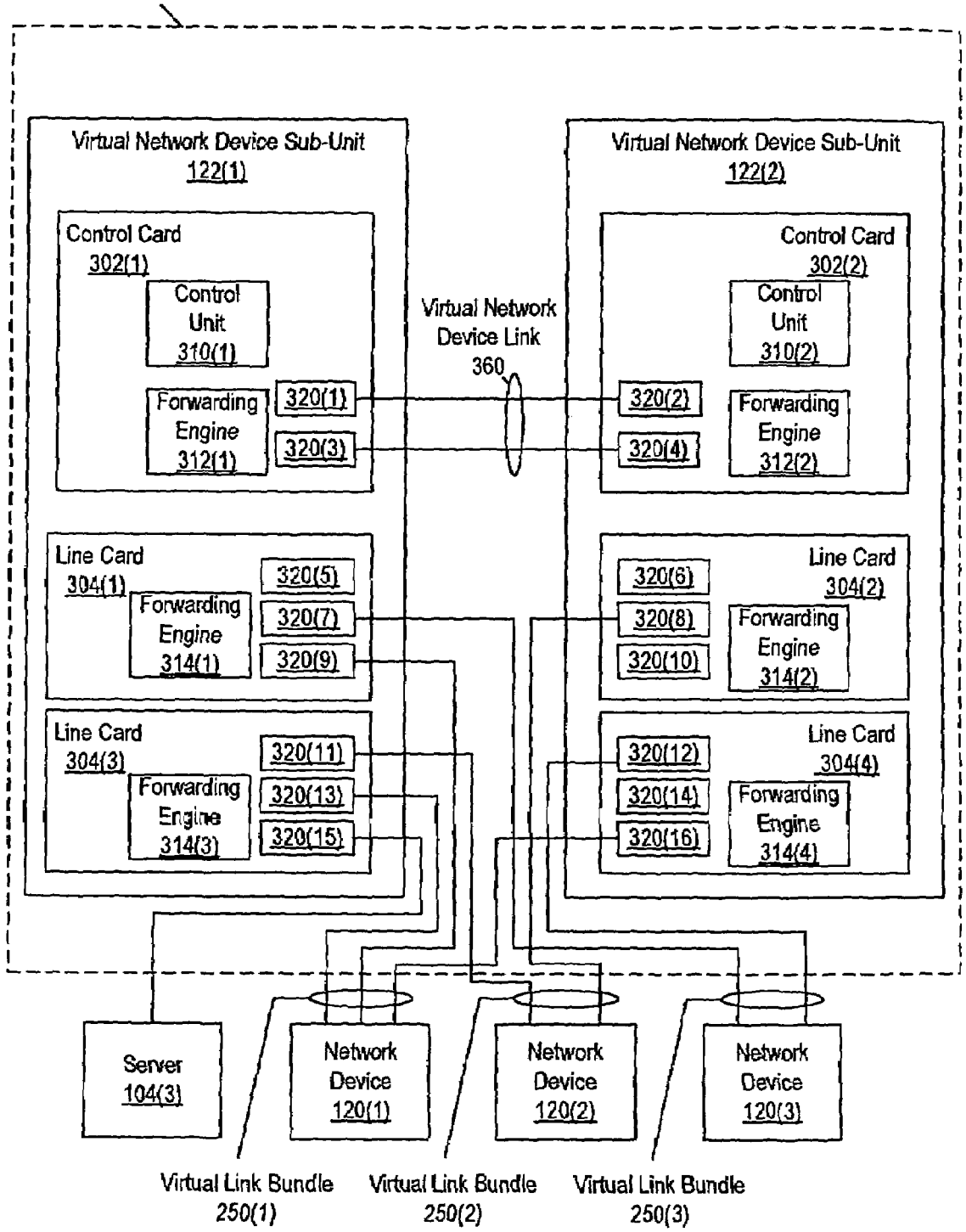
FIG. 3 shows more detail within each virtual network device sub-unit included in a virtual network device, according to one embodiment of the present invention.

Virtual network device cluster are formed from two or more virtual network device sub-units, which collectively operate as a single logical device. FIGS. 1-3 provide an example of an environment that can include one or more virtual network devices. FIGS. 4-7 provide examples of virtual network device clusters and the operation of virtual network device clusters. FIGS. 8A-9C illustrate how several ingress-specific spanning trees can be used to control how packets are forwarded through a virtual network device cluster. FIGS. 10A-11B illustrate how multiple ingress-specific spanning trees can also be used to control how packets are forwarded in other types of networks.

FIG. 1 is a block diagram of a network that includes several virtual network devices. In FIG. 1, several clients $102(1)$-$102(n)$ communicate with each other and with several servers $104(1)$-$104(n)$ via a network. Clients $102(1)$-$102(n)$ can include a variety of different devices that access networked services. For example, client $102(1)$ can be a cell phone, client $102(2)$ can be a personal computer, and client $102(n)$ can be a Personal Digital Assistant (PDA). Servers $104(1)$-$104(n)$ provide various services, such as various software-based services and/or access to shared storage devices.

The network coupling clients $102(1)$-$102(n)$ and servers $104(1)$-$104(n)$ is described in terms of several network layers. The layer closest to clients $102(1)$-$102(n)$ is access layer 110. Access layer 110 includes several network devices $120(1)$-$120(n)$. In this example, access layer 110 is the primary layer at which packets enter the network from clients $102(1)$-$102(n)$.

Distribution layer 112 aggregates flows received via access layer 110 and provides these aggregated flows to core layer 114. In this example, distribution layer 112 includes network devices $122(1)$-$122(n)$. Core layer 114 is a logically centralized portion of the network through which various aggregated flows pass. Core layer 114 includes network devices $124(1)$-$124(n)$.

In this example, data center 116 includes two sets of network devices: network devices $126(1)$-$126(n)$ and network devices $128(1)$-$128(n)$. Network devices $128(1)$-$128(n)$ provide access to the network to various servers $104(1)$-$104(n)$. Network devices $126(1)$-$126(n)$ aggregate flows from network devices $128(1)$-$128(n)$ and provide the aggregated flows to core layer 114.

It is noted that in some embodiments, networks will not include the network layers illustrated in FIG. 1 (e.g., some of the layers can be combined and/or eliminated, and alternative layers can also be included in addition to and/or instead of those shown in FIG. 1). Additionally, clients and servers can be coupled to the network differently than shown in FIG. 1 (e.g., some clients and/or servers can be coupled to individual network devices in the core and/or distribution layers). Additionally, the physical locations of devices relative to each other can differ from the logical locations shown in FIG. 1. For example, two devices in the same network layer can be physically located on different floors, in different buildings, or on different campuses. In contrast, two devices in different network layers can be located in the same room.

In some embodiments, network devices $120(1)$-$120(n)$ and $128(1)$-$128(n)$, which are located at the outer edges of the network, operate differently than network devices $122(1)$-$122(n)$, $124(1)$-$124(n)$, and $126(1)$-$126(n)$, which are located in the inner layers of the network. For example, in one embodiment, network devices $120(1)$-$120(n)$ are adjunct network devices that are controlled or otherwise subordinate to network devices in the inner layers (e.g., the distribution and core layers) of the network. In such an embodiments, the non-adjunct network devices provide L2 (Layer 2) and L3 (Layer 3) forwarding and routing, while adjunct network devices only have relatively limited forwarding and/or routing capabilities. In other embodiments, adjunct network devices do not perform any L2 forwarding or L3 routing. Instead, the adjunct network devices simply forward all packets to non-adjunct network devices for L2 forwarding and L3 routing. In some embodiments, non-adjunct network devices, coupled to adjunct network devices, control the operation of the adjunct network devices. In some embodiments, adjunct network devices are treated as remote line cards of the network devices to which the adjunct network devices are subordinate. It is also noted that in alternative embodiments, non-adjunct network devices are used in the access layer and data center instead of adjunct network devices.

Network devices 120(1)-120(n), 122(1)-122(n), 124(1)-124(n), 126(1)-126(n), and 128(1)-128(n) can include various routers, switches, gateways, and other network equipment. In many embodiments, only one network device may be needed at each layer in order for the network to function. However, multiple network devices can be included at each layer, as shown in FIG. 1, in order to provide redundancy.

It will be noted that the variable identifier "n" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements have the same number of elements as another series delimited by the same variable identifier (e.g., the number of network devices in each network layer may vary). Rather, in each instance of use, the variable identified by "n" (or any other such identifier) may hold the same or a different value than other instances of the same variable identifier.

Multiple links are implemented between devices in different network layers to provide additional redundancy. For example, as shown in FIG. 1, each network device 120(1)-120(n) in access layer 110 is coupled to distribution layer 112 by two (or more) different links. Similarly, each network device 122(1)-122(n) in distribution layer 112 is coupled to core layer 114 by two (or more) different links. In one embodiment, each link is an Ethernet link.

Within each network layer, multiple redundant network devices are configured to collectively operate as a single virtual network device. For example, as shown in FIG. 1, two or more network devices in distribution layer 112 operate as a virtual network device 202. Similarly, two or more of network devices 124(1)-124(n) operate as a single virtual network device 204, and two or more of network devices 126(1)-126(n) operate as a single virtual network device 206. More details of how two distribution-layer network devices collectively operate as a distribution-layer virtual network device 202 are shown in FIGS. 2A, 2B, and 3. Virtual network devices can be coupled to other virtual network devices, to network devices, and/or to clients and/or servers by virtual link bundles, as described below. In general, any multi-ported device (whether a physical device, such as a network device, client, or server, or a virtual network device) can be coupled to a virtual network device by a virtual link bundle that includes several links, some of which terminate on different sub-units within the virtual network device.

FIG. 2A shows an example of a network in which there are two network devices 120(1) and 120(2) in access layer 110. There are also two network devices 122(1) and 122(2) in distribution layer 112. These two network devices 122(1) and 122(2) operate as a single virtual network device 202 in this example. Each network device 120(1)-120(2) is coupled to distribution layer 112 by two links. In this example, each of those two links is coupled to a different one of network devices 122(1) and 122(2). This provides redundancy, allowing network devices 120(1) and 120(2) to continue to communicate with distribution layer 112 even if one of network devices 122(1) or 122(2) fails or if one of the links between a given access-layer network device and a given distribution-layer network device fails.

The redundant links coupling each of network devices 120(1) and 120(2) to virtual network device 202 can be operated as a single logical link, referred to herein as a virtual link bundle. Network device 120(1) operates the two links coupling network device 120(1) to virtual network device 202 as a virtual link bundle 250(1). In such an embodiment, each interface in network device 120(1) that is coupled to one of the links is included in an interface bundle, which corresponds to virtual link bundle 250(1). Network device 120(2) similarly operates the two links coupling network device 120(2) to virtual network device 202 as virtual link bundle 250(2). In some embodiments, virtual link bundles 250(1) and 250(2) are each operated as an EtherChannel™ or as an aggregated link (as described in IEEE 802.3).

As shown in FIG. 2A, each virtual link bundle 250(1) and 250(2) includes links that terminate at different network devices in distribution layer 112. For example, virtual link bundle 250(1) couples network device 120(1) to both network device 122(1) and network device 122(2). This differs from conventional implementations in which logical links are only allowed between a single pair of network devices.

In some embodiments, network devices 120(1) and 120(2) are aware (e.g., through various state information maintained within each network device) that each virtual link bundle 250(1) and 250(2) includes links that are terminated on different network devices in distribution layer 112. In such an embodiment, network devices 120(1) and 120(2) can select a link within a particular virtual link bundle on which to send a packet based on this awareness. In alternative embodiments, however, network devices 120(1) and 120(2) are not aware of whether a particular virtual link bundle includes links that are terminated on different network devices in the distribution layer.

As shown in FIG. 2A, network devices 122(1) and 122(2) operate as a single virtual network device 202. FIG. 2B illustrates how, from the perspective of network device 120(1) in access layer 110, network device 120(1) is coupled to a single network device, virtual network device 202, in distribution layer 112 by a redundant pair of links. Network device 120(2) has a similar perspective of virtual network device 202.

In embodiments, such as the one shown in FIG. 2B, in which network devices 120(1) and 120(2) see themselves as being connected to a single network device, the use of a virtual link bundle is simplified. For example, if network device 120(1) is aware that virtual link bundle 250(1) terminates at two different network devices, network device 120(1) selects a link on which to send a particular packet based on Spanning Tree Protocol. The use of Spanning Tree Protocol may involve more overhead and/or be more restrictive with respect to which links can be used to send a given packet (e.g., Spanning Tree Protocol might block all but one of the links, preventing utilization of all but one non-blocked link) than if network device 120(1) simply views virtual network device 202 as a single entity. When viewing virtual network device 202 as a single entity, for example, network device 120(1) simply select a link on which to send a packet based on load-sharing constraints. Similarly, if a link within virtual link bundle 250(1) fails, there is no need for network device 120(1) to change how Spanning Tree Protocol is applied. Instead, network device 120(1) simply continues to use the non-failed links within virtual link bundle 250(1).

The individual network devices, such as network device 122(1) and 122(2), included in virtual network device 202 are each referred to herein as a "virtual network device sub-unit". In some embodiments, virtual network device sub-units 122(1) and 122(2) are each implemented in a separate chassis (i.e., each chassis houses a single virtual network device sub-unit). For example, in FIG. 2A, network devices 122(1) and 122(2) can each be implemented in a separate chassis. Even if virtual network device sub-units 122(1) and 122(2) share a chassis, each virtual network device sub-unit can be made to operate as an independent network device, allowing one virtual network device sub-unit to continue operating if the other virtual network device sub-unit(s) in the virtual network device fail. For example, virtual network device sub-unit 122(1) and virtual network device sub-unit 122(2) can be in the same chassis, but each virtual network device sub-unit can have independent hardware, ports, uplink interfaces, and power supplies, and each can be removed from the chassis independently of the other. If virtual network device sub-unit 122(1) fails (e.g., due to a power supply failure or a software error), virtual network device sub-unit 122(2) can continue to run. In such an embodiment, virtual network device sub-unit 122(1) can be removed for repair or replacement without disrupting the operation of virtual network device sub-unit 122(2).

In some embodiments, the links in a virtual link bundle coupling a network device to an adjunct network device are specialized links, referred to herein as uplinks, that are used to couple an adjunct network device to a virtual network device. Each uplink can convey both a packet and additional information generated within one of the network devices. For example, in one embodiment, if a packet is being conveyed on an uplink from an access-layer adjunct network device to a distribution-layer network device, additional information conveyed on the uplink with the packet includes information identifying which of the adjunct network device's ports received the packet. The additional information also includes information indicating whether any forwarding or routing has already been performed on the packet by the sending device. In some embodiments, use of uplinks allows a virtual network device to control adjunct network devices that are coupled to that virtual network device. The use of uplinks also facilitates the virtual network device being able to perform routing and/or forwarding for subordinate adjunct network devices. An interface within a network device or adjunct network device that is coupled to an uplink is referred to herein as an uplink interface.

FIG. 3 shows more detail within each network device included in a virtual network device. Here, virtual network device 202 includes two virtual network device sub-units 122(1) and 122(2). It is noted that in other embodiments, virtual network device 202 includes more than two component network devices. In this example, virtual network device 202 is located at the distribution layer of the network. However, similar virtual network devices can be implemented in other network layers (e.g., within the data center and/or core layer).

Virtual network device 202 is coupled to several access-layer network devices 120(1)-120(3). Network devices 120(2) and 120(3) are each coupled to virtual network device 202 by two uplinks, one to each virtual network device sub-unit 122(1) and 122(2). Network device 120(2) is coupled to virtual network device by virtual link bundle 250(2), and network device 120(3) is coupled to virtual network device 202 by virtual link bundle 250(3). As a result, network devices 120(2) and 120(3) continue to communicate with the distribution layer even if one of these uplinks and/or one of virtual network device sub-units 122(1) and 122(2) fail. Network device 120(1) is coupled to virtual network device 202 by three uplinks: two uplinks to virtual network device sub-unit 122(1) and one uplink to virtual network device sub-unit 122(2). These three uplinks collectively form virtual link bundle 250(1). Network device 120(1) continues to communicate with the distribution layer even if two of the three uplinks and/or one of virtual network device sub-units 122(1) and 122(2) fail. Network devices 120(1)-120(3) each operate multiple uplinks to virtual network device 202 as a single logical uplink. Additionally, in some embodiments, each network device 120(1)-120(3) operates in the same manner that the network device would operate in if coupled to a single distribution-layer device (as opposed to operating in the manner that the network device would operate in if that network device were coupled to two independent distribution-layer network devices).

Distribution-layer virtual network device sub-unit 122(1) is also coupled to a server 104(3) by a single link. In this example, server 104(3) will be unable to communicate via the distribution layer if either network device 122(1) or the link coupling server 104(3) to network device 122(1) fails. It is noted that in alternative embodiments, a server such as server 104(3) but having multiple ports could be coupled to multiple virtual network device sub-units by a virtual link bundle, and that such a server could interact with virtual network device sub-units 122(1) and 122(2) as if those sub-units were a single virtual network device 202.

Virtual network device sub-unit 122(1) includes several cards, including control card 302(1) and line cards 304(1) and 304(3). Similarly, virtual network device sub-unit 122(2) includes control card 302(2) and line cards 304(2) and 304(4). Control card 302(1) includes control unit 310(1), forwarding engine 312(1), and interfaces 320(1) and 320(3). Control card 302(2) likewise includes control unit 310(2), forwarding engine 312(2), and interfaces 320(2) and 320(4).

In virtual network device sub-unit 122(1), line card 304(1) includes forwarding engine 314(1) and interfaces 320(5), 320(7), and 320(9). Interface 320(7) is coupled to network device 120(3). Interface 320(9) is also coupled to network device 120(1). Interface 320(5) is unused in this example. Line card 304(3) includes forwarding engine 314(3) and interfaces 320(11), 320(13), and 320(15). Interfaces 320(11) and 320(13) are respectively coupled to network devices 120(2) and 120(1). Interface 320(15) is coupled to server 104(3). In embodiments in which network devices 120(1)-120(3) are adjunct network devices controlled by virtual network device 202, interfaces 320(7), 320(9), 320(11), and 320(13) are operated as uplink interfaces, while interface 320(15), which is not coupled to an adjunct network device, is operated as a normal port.

In virtual network device sub-unit 122(2), line card 304(2) includes forwarding engine 314(2) and interfaces 320(6), 320(8), and 320(10). Interface 320(8) is coupled to adjunct network device 120(2), and interfaces 320(6) and 320(10) are unconnected. Line card 304(4) includes forwarding engine 314(4) and interfaces 320(12), 320(14), and 320(16). Interfaces 320(12) and 320(16) are respectively coupled to adjunct network devices 120(3) and 120(1). Interface 320(14) is unused. In embodiments in which network devices 120(1)-120(3) are adjunct network devices controlled by virtual network device 202, interfaces 320(8), 320(12), and 320(16) are operated as uplink interfaces, Note that while the interfaces in FIG. 3 have been described as both ingress and egress interfaces, interfaces that act as ingress-only or egress-only interfaces can also be used. For example, the functionality of each of the interfaces shown in FIG. 3 can be implemented using one ingress-only interface and one egress-only interface. Similarly, virtual link bundles 250(1)-250(3) can each include several links that only convey packets from a respective network device 120(1)-120(3) to virtual network device 202 and several links that only convey packets from virtual network device 202 to a respective network device 120(1)-120(3).

In the illustrated embodiment, control card 302(1) in virtual network device sub-unit 122(1) is coupled to control card 302(2) in virtual network device sub-unit 122(2) via a virtual network device link 360. In this example, virtual network device link 360 includes two links (two links are used to provide increased fault-tolerance and/or bandwidth; however, one link can be used in other embodiments). These links are a type of uplink in this example, carrying information (e.g., such as headers similar to those sent between line cards) in addition to packets. The uplinks in virtual network device link 360 are used to exchange information, which controls the operation of virtual network device 202, as well as packets between virtual network device sub-units 122(1) and 122(2). By communicating via these uplinks, virtual network device sub-units 122(1) and 122(2) coordinate their behavior such that virtual network device sub-units 122(1) and 122(2) appear to be a single virtual network device to network devices 120(1)-120(3).

Thus, providing interconnections between virtual network device sub-units 122(1) and 122(2) allows virtual network device sub-units 122(1) and 122(2) to operate as a single virtual network device 202. Network devices 120(1)-120(3) communicate with virtual network device 202 in the same way that network devices 120(1)-120(3) would communicate with a single physical device. For example, if network device 120(2) is handling a packet addressed to server 104(3), network device 120(2) selects one of the two uplinks in network device bundle 250(2) on which to send the packet. This selection is based on load-sharing criteria in some embodiments. In such a situation, since virtual network device 202 appears to be a single network device, network device 120(2) is just as likely to select the uplink to virtual network device sub-unit 122(2) as the uplink to virtual network device sub-unit 122(1), despite the fact that only virtual network device sub-unit 122(1) has a direct connection to server 104(3). If the packet is sent to virtual network device sub-unit 122(2), network device 122(2) uses one of the uplinks included in virtual network device link 360 between virtual network device sub-units 122(1) and 122(2) to send the packet to virtual network device sub-unit 122(1), and virtual network device sub-unit 122(1) can in turn provide the packet to the packet's destination, server 104(3).

In other embodiments, network devices 120(1)-120(3) are aware that virtual link bundles 250(1) and 250(2) actually terminate on two different network devices. Network devices 120(1)-120(3) control packet transmission based on this information. For example, in this situation, network device 120(2) handles a packet addressed to server 104(3) by selecting the uplink coupled to virtual network device sub-unit 122(1) instead of the uplink coupled to virtual network device sub-unit 122(2), based on the fact that network device 120(2) recognizes separate connections to two different network devices within the logical link.

Interfaces 320(13), 320(9), and 320(16), which are each coupled to network device 120(1) by virtual link bundle 250(1), form an interface bundle (e.g., an EtherChannel™ port bundle). Similarly, interfaces 320(11) and 320(8) form another interface bundle that is coupled to network device 120(2) by virtual link bundle 250(2). Interfaces 320(7) and 320(12) form a third interface bundle that is coupled to network device 120(3) by virtual link bundle 250(3). Within virtual network device 202, each interface in the same interface bundle is assigned the same logical identifier. For example, interfaces 320(13), 320(9), and 320(16) are each assigned the same logical identifier. In some embodiments, packets received via one of these interfaces are tagged or otherwise associated with the logical identifier to indicate that those packets were received via the virtual link bundle coupling virtual network device 202 to network device 120(1). It is noted that similar interface bundles are implemented within each network device 120(1)-120(3), and that interfaces included in such bundles are also assigned the same logical identifier by each network device (or by virtual network device 202, in embodiments in which virtual network device 202 controls the configuration of the network devices 120(1)-120(3)). For example, network device 120(1) can assign the same logical identifier to each of the interfaces coupled to virtual link bundle 250(1).

The association between a packet and a particular logical identifier is used by forwarding engines within virtual network device 202 to route and forward packets to and from network devices 120(1)-120(3). For example, when a packet from a sending device (e.g., a client coupled to network device 120(1)) is received via uplink interface 320(13), virtual network device sub-unit 122(1) learns that the sending device's MAC (Media Access Control) address is "behind" uplink interface 320(13) by associating the MAC address with the logical identifier of uplink interface 320(13). Virtual network device sub-unit 122(1) informs each forwarding engine in virtual network device sub-unit 122(1) as well as each forwarding engine in virtual network device sub-unit 122(2) of this association. Based on the association, packets addressed to that MAC address will be sent from an uplink interface having the associated logical identifier. Since in this case, uplink interfaces 320(9) (in virtual network device sub-unit 122(1)) and 320(16) (in virtual network device sub-unit 122(2)) also have the same logical identifier as uplink interface 320(13), a packet addressed to that MAC address can be forwarded via any of uplink interfaces 320(9), 320(13), and 320(16).

The same logical identifiers are used to identify uplink interface bundles by each of virtual network device sub-units 122(1) and 122(2), and the virtual network device sub-units coordinate to assign the same logical identifier to each uplink interface within the same uplink interface bundle. When forwarding packets via an uplink interface bundle identified by a particular logical identifier, each virtual network device sub-unit 122(1) and 122(2) generates a hash value to select one of the uplink interfaces within that uplink interface bundle on which to send the packet. Each of the virtual network device sub-units uses these hash values to identify local uplink interfaces within that virtual network. Thus, each virtual network device sub-unit will only select an uplink interface that is local to that virtual network device sub-unit. For example, if virtual network device sub-unit 122(1) is forwarding a packet via the uplink interface bundle that includes interfaces 320(9), 320(13), and 320(16), the hash value generated by virtual network device sub-unit will identify one of interfaces 320(9) or 320(13).

In the above example, by associating each hash value with local uplink interfaces in the uplink interface bundle, the usage of virtual switch link 360 is reduced. Essentially, virtual network device sub-unit 122(1) favors local uplink interfaces within a particular uplink interface bundle over remote uplink interfaces, in the same uplink interface bundle, on virtual network device sub-unit 122(2). Likewise, virtual network device sub-unit 122(2) favors local uplink interfaces within a particular uplink interface bundle over uplink interfaces included in virtual network device sub-unit 122(1). For example, if virtual network device sub-unit 122(2) needs to forward a packet via an uplink interface, virtual network device sub-unit 122(2) will send that packet via uplink interface 320(12) instead of forwarding that packet across virtual network device link 360 to be sent via uplink interface 320(7). By favoring local interfaces, the amount of traffic sent over virtual network device link 360 is reduced, since each virtual network device sub-unit 122(1) and 122(2) will forward locally-received packets (i.e., packets received via interfaces other than those coupled to virtual network device link 360) from a local interface.

In some embodiments, for a given virtual link bundle, that virtual link bundle is managed (e.g., with respect to control protocols such as L2 protocols) in a central location. For example, all of the control protocol processing for virtual link bundle 250(1) can take place in control unit 310(1) of virtual network device sub-unit 122(1). The results of this control protocol processing are then communicated to control unit 310(2) of virtual network device sub-unit 122(2) and/or to a controller in network device 120(1). Control unit 310(2) then uses (but not modify) this information when controlling how packets sent from and received via uplink interface 320(16) (which is in the uplink interface bundle coupled to virtual link bundle 250(1)) are handled. For example, control unit 310(2) uses this information to set up or modify lookup tables on line cards 304(2) and/or 304(4). In this way, the actual control protocol processing is centralized in control unit 310(1), as opposed to being distributed among several control units in virtual network device 202.

The central point of control protocol processing can vary among virtual link bundles. For example, while control protocol processing for virtual link bundle 250(1) is managed by control unit 310(1), control protocol processing for virtual link bundle 250(2) can be managed by control unit 310(2). In other words, control unit 310(2) can perform all of the control processing for virtual link bundle 250(2), and the information generated by control unit 310(2) can then be communicated to control unit 310(1) for use (but not modification) within virtual network device sub-unit 122(1).

In embodiments that implement a central point of management within virtual network device 202 for each virtual link bundle's control protocol processing, L2 protocols can be run across the virtual link bundle and/or interface bundles can be used as routed L3 interfaces. These abilities would not be available if the virtual network device sub-units within virtual network device 202 each performed control protocol processing for local interfaces independently of each other. Additionally, in embodiments implementing a central point of control protocol processing, a user can modify the virtual link bundle's control protocol behavior by accessing a single virtual network device sub-unit. In the above example, when updating control protocol behavior of virtual link bundle 250(1), a user can simply access virtual network device sub-unit 122(1) (instead of accessing both virtual network device sub-units 122(1) and 122(2)). Virtual network device sub-unit 122(1) then automatically propagates to network device 122(2) any changes made by the user to the control protocols. Furthermore, since the use of virtual link bundles allows several uplinks to be managed as a single logical uplink, fewer uplink interfaces need to be configured than would be required if virtual link bundles were not used. For example, if each virtual link bundle includes two uplinks, the number of uplink interfaces within virtual network device 202 that need to be configured by a user is halved.

Virtual network device sub-units 122(1) and 122(2) implement certain behaviors in order to act as a virtual network device 202 that, from the perspective of network devices 120(1)-120(3), appears to be a single logical network device. For example, whenever virtual network device sub-unit 122(2) receives a packet from a local network device, client, or server and that packet's destination logical identifier identifies an uplink interface bundle, virtual network device sub-unit 122(2) sends the packet from a local uplink interface within the identified uplink interface bundle. Virtual network device sub-unit 122(2) can also provide the packet to virtual network device sub-unit 122(1), but virtual network device sub-unit 122(1) should not output this packet on a virtual link bundle. This way, the destination device only receives one copy of the packet from virtual network device 202 (as opposed to receiving one copy from each virtual network device sub-unit 122(1) and 122(2)) and the appearance of virtual network device 202 being a single entity is maintained.

To operate in this way, each egress uplink interface coupled to a link in a virtual link bundle is configured to filter out traffic received via virtual network device link 360. For example, a packet is received at virtual network device sub-unit 122(1) via virtual network device link 360. The interface 320(1) or 320(3) that receives the packet updates information (e.g., in a header) associated with the packet to indicate that the packet was received via virtual network device link 360 (in alternative embodiments, the sending interface in virtual network device sub-unit 122(2) can update this information). When virtual network device sub-unit 122(1) looks up the destination address of the packet in a lookup table, the lookup table returns the logical identifier that identifies local uplink interfaces 320(9) and 320(13). The packet is then forwarded to uplink interface 320(13) (e.g., selected based on load-sharing considerations). When uplink interface 320(13) receives the packet, uplink interface 320(13) will only output the packet if the packet was not received via virtual switch link 360, since if the packet was received via the virtual switch link, the other virtual network device sub-unit 122(2) will have already sent the packet via the virtual link bundle. Thus, uplink interface 320(13) can filter the packet from the packet flow being sent via uplink interface 320(13) based on the information appended to the packet that indicates whether the packet was received via virtual network device link 360.

In some embodiments, MAC notification frames are used to keep the content of the L2 tables in virtual network device sub-unit 122(1) synchronized with the content of the L2 tables in virtual network device sub-unit 122(2) and vice versa Whenever a MAC notification that involves a port behind a virtual link bundle or an uplink interface included in an uplink interface bundle is generated within a virtual network device sub-unit (e.g., such a notification can be generated by one line card in order to update an L2 table on another line card), a copy of the MAC notification is sent via to virtual network device link 360. Similarly, if a virtual network device sub-unit determines that a packet should be flooded, the virtual network device sub-unit will send a copy of that packet via virtual network device link 360, ensuring that the virtual network device sub-unit will receive a copy of any MAC notification response generated by a forwarding engine in the peer virtual network device sub-unit.

By way of example, assume that virtual network device sub-unit 122(1) floods a packet because the forwarding engine(s) included in virtual network device sub-unit 122(1) do not know which port or uplink interface is associated with the packet's destination address. As part of flooding the packet, virtual network device sub-unit 122(1) sends a copy of the packet to virtual network device sub-unit 122(2) via virtual switch link 360. If a forwarding engine within virtual network device sub-unit 122(2) already knows that the destination address is behind a particular uplink interface or port (e.g., if a forwarding table already includes an entry associating the destination address with a port of one of network devices 120), that forwarding engine generates a MAC notification identifying this association, which is distributed to any other forwarding engines within virtual network device sub-unit 122(2). Since the packet was originally received via virtual network device link 360, virtual network device sub-unit 122(2) also sends a copy of the MAC notification back via virtual network device link 360. This MAC notification is then distributed among the forwarding engines included in virtual network device sub-unit 122(1). After being updated based on the MAC notification, the forwarding engines in virtual network device sub-unit 122(1) now know the location of the device identified by the destination address. Accordingly, subsequently received packets addressed to that device are not flooded.

When all of the physical links in a virtual link bundle that connect to a single virtual network device sub-unit fail, the virtual link bundle transitions to a normal link bundle that is coupled to a single virtual network device sub-unit. At this point, the behavior of each virtual network device sub-unit with respect to that network device bundle is modified. For example, assume that all of the uplinks in virtual link bundle 250(1) that are coupled to virtual network device sub-unit 122(2) fail. At this point, virtual network device sub-unit 122(2) no longer has any local uplink interfaces that can send packets via virtual link bundle 250(1). Accordingly, virtual network device sub-unit 122(2) will redirect all traffic that needs to be sent via virtual link bundle 250(1) across virtual network device link 360. Additionally, since network device 122(2) can no longer send packets via virtual link bundle 250(1), virtual network device sub-unit 122(1) will cease to filter traffic received via virtual network device link 360 from being sent via virtual link bundle 250(1). If at least one of the uplinks in virtual link bundle 250(1) that is coupled to virtual network device sub-unit 122(2) is restored, virtual link bundle 250(1) will transition back to the normal mode of operation, in which virtual network device sub-unit 122(2) will send locally-received packets via virtual link bundle 250(1) and virtual network device sub-unit 122(1) will filter packets received via virtual network device link 360 from being sent virtual link bundle 250(1).

Virtual Network Device Clusters

Figure 4:
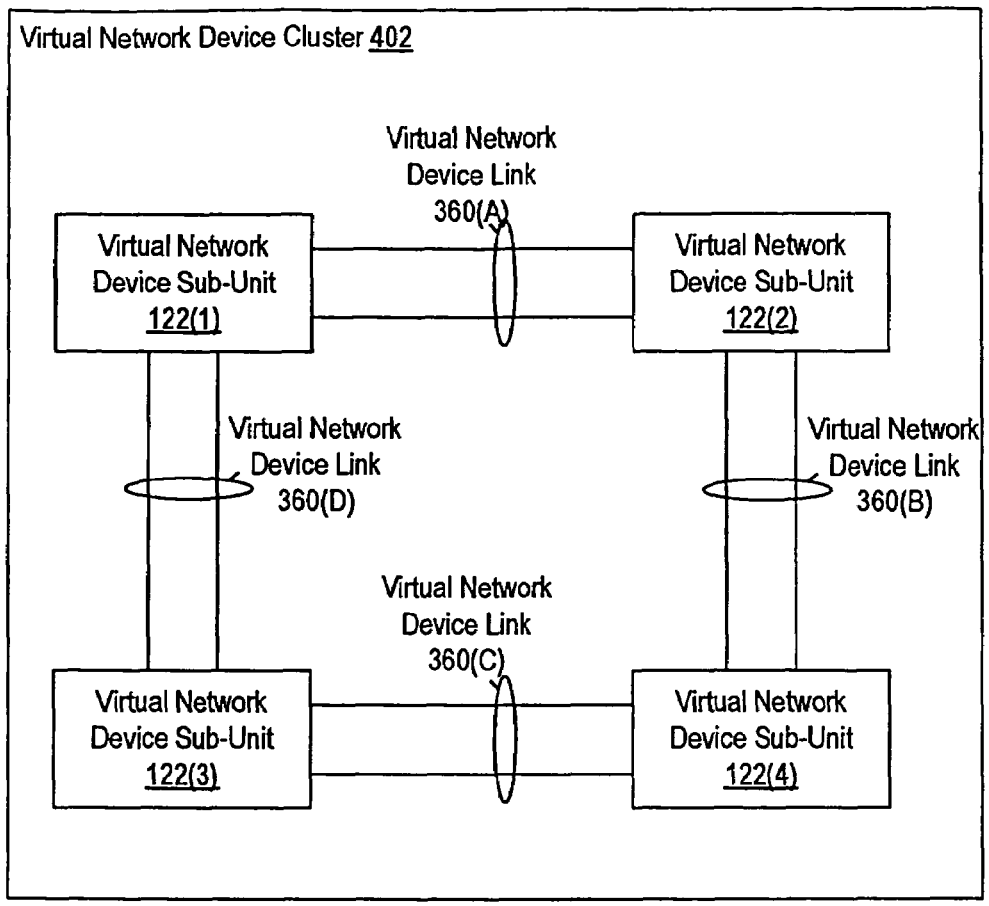
FIG. 4 shows an example of a virtual network device cluster that includes four virtual network device sub-units, according to one embodiment of the present invention.

FIG. 4 shows an example of a virtual network device cluster that includes four virtual network device sub-units. A virtual network device cluster is a virtual network device that includes two or more virtual network device sub-units. In this example, virtual network device cluster 402 is a cluster of virtual network device sub-units 122(1)-122(4). Each virtual network device sub-unit 122(1)-122(4) can be similar to the virtual network device sub-units of FIG. 3.

Each virtual network device sub-unit within a virtual network device cluster is coupled to at least one other virtual network device sub-unit within the same virtual network device cluster by a virtual network device link. In the example of FIG. 4, virtual network device sub-unit 122(1) is coupled to virtual network device sub-unit 122(2) by virtual network device link 360(A) and to virtual network device sub-unit 122(3) by virtual network device link 360(D). Virtual network device sub-unit 122(1) is not directly coupled to virtual network device sub-unit 122(4). Virtual network device sub-unit 122(2) is coupled to virtual network device sub-unit 122(1) by virtual network device link 360(A) and to virtual network device sub-unit 122(4) by virtual network device link 360(B). Virtual network device sub-unit 122(2) is not directly coupled to virtual network device sub-unit 122(3). Virtual network device sub-unit 122(3) is coupled to virtual network device sub-unit 122(1) by virtual network device link 360(D) and to virtual network device sub-unit 122(4) by virtual network device link 360(C). Virtual network device sub-unit 122(3) is not directly coupled to virtual network device sub-unit 122(2). Virtual network device sub-unit 122(4) is coupled to virtual network device sub-unit 122(2) by virtual network device link 360(B) and to virtual network device sub-unit 122(3) by virtual network device link 360(C). Virtual network device sub-unit 122(4) is not directly coupled to virtual network device sub-unit 122(1).

Each virtual network device link between a pair of virtual network device sub-units includes one or more links. In this example, virtual network device links 360(A)-360(D) each includes two links. Each virtual network device link 360(A)-360(D) that includes multiple links is operated as a logical link bundle, such as an EtherChannel™. It is also noted a virtual network device link can also be implemented as a virtual link bundle that couples one virtual network device sub-unit to several other virtual network device sub-units (e.g., as shown in FIG. 5B).

Providing more than two virtual network device sub-units within a virtual network device cluster provides additional redundancy in some situations. For example, if a virtual link bundle includes at least one link to each of the four virtual network device sub-units 122(1)-122(4) shown in FIG. 4, that virtual link bundle can continue to operate even if the links coupled to three of the virtual network device sub-units fail. Similarly, such a virtual link bundle can continue to operate despite the failure of three of the four virtual network device sub-units.

Virtual network device clusters also allow the number of interfaces within a virtual network device to be increased. In some situations, it is desirable to increase the number of interfaces at a particular network layer that is implemented using a virtual network device. Due to physical characteristics of each virtual network device sub-unit, the number of interfaces that can be included within a given virtual network device sub-unit may be limited. In such a situation, if the network layer is implemented from a virtual network device that is limited to including at most two sub-units, another virtual network device will be needed in order to provide the desired number of interfaces in the network layer. This presents a considerable incremental cost to the user, especially if only a small number of additional interfaces (relative to the total number in each virtual network device) are needed. Additionally, the use of an additional virtual network device will introduce an additional point of management into the network layer. The use of this additional virtual network device can also complicate routing algorithms (such as Spanning Tree algorithms) that attempt to prevent loops within the overall network, since such a routing algorithm will treat each virtual network device as a separate network device.

By allowing a virtual network device to include more than two virtual network device sub-units, the above problems are reduced or avoided. Additional virtual network device sub-units can be added to a virtual network device cluster in order to provide additional interfaces at a particular network layer. At the same time, however, the additional virtual network device sub-units will still function as part of the same logical network device as the original virtual network device sub-units. Accordingly, the number of points of management within the network will not be affected. Additionally, routing algorithms running on the overall network will behave as if the virtual switch cluster is a single logical network device.

In some situations, expanding the virtual network device to more than two virtual network device sub-units provides a higher effective forwarding throughput than an equivalent set of multiple co-located virtual network devices, which each include only two virtual network device sub-units, might otherwise provide. Additionally, if a virtual network device cluster uses at least one interface in each virtual network device sub-unit in each interface bundle, the maximum forwarding capacity of a virtual network device cluster is proportional to the maximum number of virtual network device sub-units that can be included within the virtual network device cluster.

In some embodiments that implement virtual link bundles, each virtual link bundle attached to a virtual network device cluster is allowed to span more than two different virtual network device sub-units within the virtual network device cluster. However, some virtual link bundles are attached to fewer than all of the virtual network device sub-units within a virtual network device.

Figure 5A:
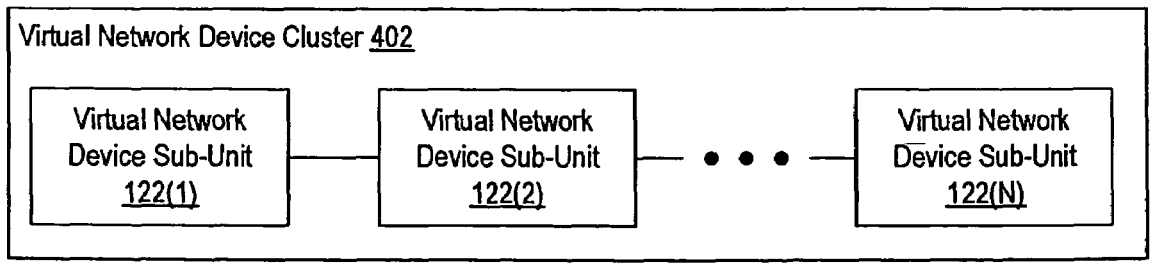
FIGS. 5A-5C illustrate other virtual network device cluster configurations, according to alternative embodiments of the present invention.
Figure 5B:
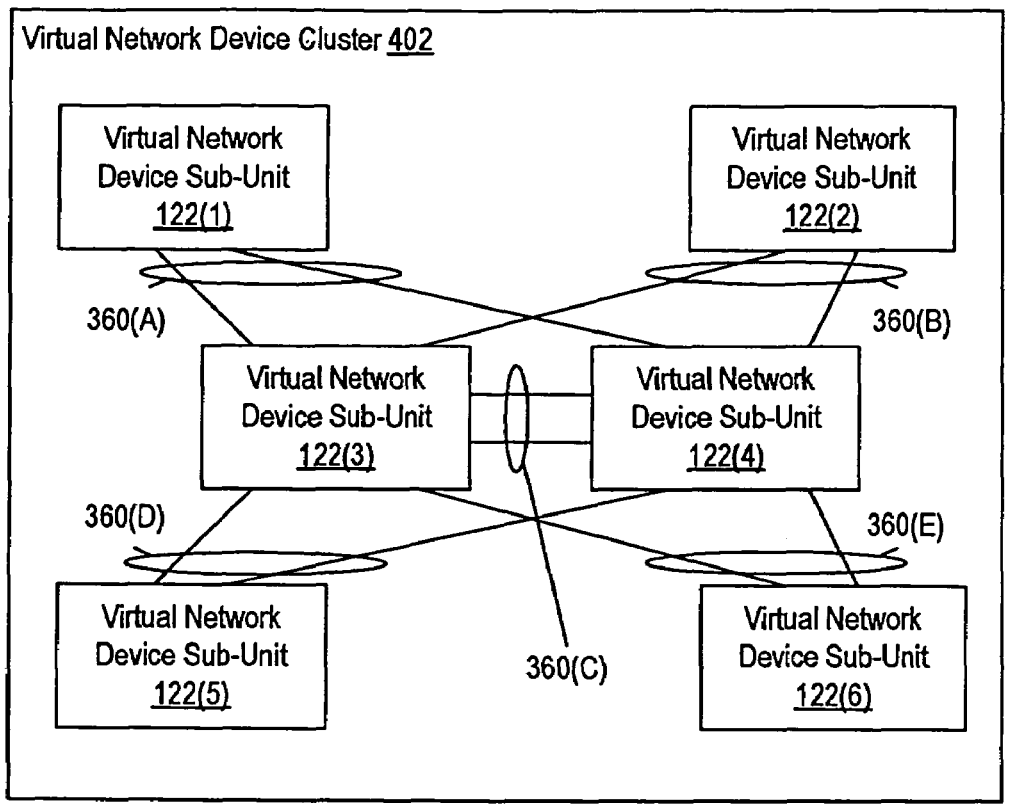
Figure 5C:
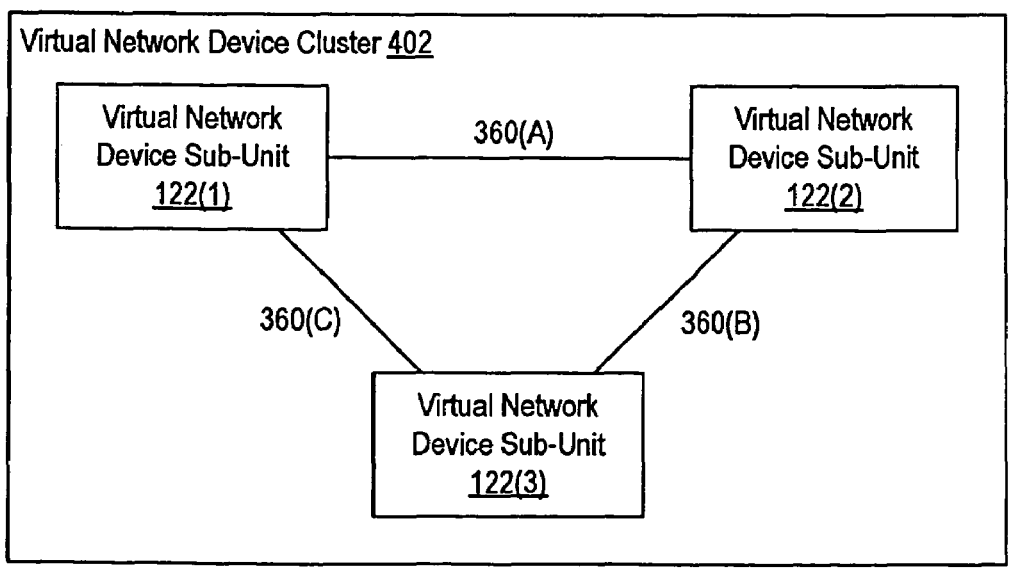

FIGS. 5A-5C illustrate several other virtual switch cluster configurations, according to alternative embodiments of the present invention. These configurations are provided as examples. It is noted that many other configurations of virtual network device clusters can be implemented in other embodiments.

As shown in FIG. 5A, a virtual network device cluster 402 includes N virtual network device sub-units 122(1)-122(N). Virtual network device sub-units 122(1) and 122(N), which are located at each "end" of virtual network device cluster 402, are each coupled to one other virtual network device sub-unit. The remaining virtual network device sub-units 122(2)-122(N−1) (not shown) within virtual network device cluster 402 are each coupled to two other virtual network device sub-units. Virtual network device sub-units 122(1)-122(N) are arranged in "series" with each other, such that a packet being sent from a device at one "end" of the virtual network device to the other "end" will be conveyed via each intervening sub-unit within the virtual network device.

FIG. 5B illustrates a virtual network device cluster 402 that includes six virtual network device sub-units 122(1)-122(6). In this example, two virtual network device sub-units 122(3) and 122(4) are coupled to each other by virtual network device link 360(C). Virtual network device sub-units 122(1), 122(2), 122(5), and 122(6) are each attached to both virtual network device sub-units 122(3) and 122(4) by a respective one of virtual network device links 360(A), 360(B), 360(D), and 360(E). As this example shows, links in the same virtual network device link can terminate at different virtual network device sub-units. In one embodiment, virtual network device sub-units 122(1), 122(2), 122(5), and 122(6) interact with virtual network device sub-units 122(3) and 122(4) as if virtual network device sub-units 122(3) and 122(4) are a single logical sub-unit. Thus, a virtual network device cluster can be configured with several levels of virtualization.

In FIG. 5C, another example of a virtual network device cluster is shown. Here, virtual network device cluster 402 includes three virtual network device sub-units 122(1)-122(3). In this example, each virtual network device sub-unit is coupled to each other virtual network device sub-unit within virtual network device cluster 402. Virtual network device sub-unit 122(1) is coupled to virtual network device sub-unit 122(2) by virtual network device link 360(A). Virtual network device sub-unit 122(2) is coupled to virtual network device sub-unit 122(3) by virtual network device link 360(B). Virtual network device sub-unit 122(3) is coupled to virtual network device 122(1) by virtual network device link 360(C).

Each virtual network device cluster 402, regardless of the internal configuration of virtual network device sub-units within that virtual network device cluster, operates as a single logical network device. Thus, like the virtual network device of FIG. 3, each virtual network device cluster operates to ensure that multiple virtual network device sub-units do not each send a copy of the same packet to the same destination device. Additionally, the virtual network device cluster operates to prevent packets from "looping" within the virtual network device cluster. A packet "loops" when a virtual network device sub-unit receives a copy of a packet that has already been forwarded by that virtual network device sub-unit.

FIG. 6A illustrates an example of a virtual network device cluster that uses virtual network sub-unit identifiers to prevent looping and to ensure that the virtual network device cluster does not send multiple copies of the same packet to the same destination. Virtual network device clusters with different configurations, such as those shown in FIGS. 4 and 5A-5C, can also use virtual network sub-unit identifiers to prevent looping and to ensure that a virtual network device does not send multiple copies of the same packet to the same destination.

Virtual network device cluster 402 of FIG. 6A includes virtual network device sub-units 122(1)-122(3). In this example, virtual network device cluster 402 is a distribution-layer device that is coupled to several access-layer network devices 120(1)-120(4). Virtual network device link 360(A) couples virtual network device sub-unit 122(1) to virtual network device sub-unit 122(2). Virtual network device link 360(B) couples virtual network device sub-unit 122(2) to virtual network device sub-unit 122(3).

Virtual network device sub-unit 122(1) has several interfaces, including port P1, which is coupled to network device 120(1), and an interface that is part of interface bundle IB1. Virtual network device sub-unit 122(1) also includes an interface V1 that is coupled to virtual network device link 360(A).

Virtual network device sub-unit 122(2) includes interface V2, which is coupled to virtual network device link 360(A), and interface V3, which is coupled to virtual network device link 360(B). Virtual network device sub-unit 122(2) also includes a local interface that is part of interface bundle IB1 as well as interface P2, which is coupled to network device 120(3).

Virtual network device sub-unit 122(3) includes interface V4, which is coupled to virtual network device link 360(B). Virtual network device sub-unit 122(3) also includes interface P3, which is coupled to network device 120(4). As shown, virtual network device sub-unit 122(3) does not include a local interface within interface bundle IB1 (i.e., interface bundle IB1 spans fewer than all of the virtual network device sub-units within virtual network device cluster 402).

It is noted that each interface within each virtual network device sub-unit 122(1)-122(3) can include several physical interfaces, and that each link coupled to a virtual network device sub-unit can include several physical links. For example, virtual network device link 360(A) can be an aggregated link, and thus interface V1 can include several physical interfaces.

In FIG. 6A, each virtual network device sub-unit within the virtual network device cluster is assigned a unique virtual network device sub-unit identifier. Here, virtual network device sub-unit 122(1) is assigned identifier "01", virtual network device sub-unit 122(2) is assigned identifier "02", and virtual network device sub-unit 122(3) is assigned identifier "03". These identifiers are used to track which virtual network device sub-units within the virtual network device cluster have already handled a given packet. It is noted that in alternative embodiments, several unique identifiers are assigned to each virtual network device sub-unit. For example, in one embodiment, each virtual network device sub-unit is assigned one identifier per local interface. In such an embodiment, the unique identifiers can identify both a virtual network device sub-unit and an interface within that virtual network device sub-unit.

Each packet that is handled by virtual network device cluster 402 is associated with one of the identifier. In one embodiment, this association is established by appending a header containing one of the identifiers to each packet that is received by virtual network device cluster 402. The particular identifier included in a given packet's header identifies the first virtual network device sub-unit within virtual network device cluster 402 to receive that packet. For example, if network device 120(1) sends a packet to interface P1 of virtual network device cluster 402, a header that includes identifier "01" will be appended to the packet.

Identifiers can be associated with packets received by a virtual network device sub-unit at packet ingress and/or packet egress. For example, in one embodiment, each interface (V1, P1, and the local interface in IB1) within virtual network device sub-unit 122(1) is configured to append a header to packets received via that interface, such that headers are appended to packets upon ingress into virtual network device sub-unit 122(1). In other embodiments, each interface within virtual network device 122(1) appends headers to packets as those packets are sent from that interface. The headers can include other information in addition to the virtual network device sub-unit identifiers. For example, the headers can also include information that identifies an interface that originally received the packet and/or information that identifies the result of a lookup performed for the packet. It is noted that in one embodiment, interfaces to virtual network device links, such as interface V1, associate a received packet with an identifier (by appending a header to the packet or by updating an existing header) if no association between the packet and the identifier has already been created.

In one embodiment, certain interfaces do not append packets to headers. In such embodiments, another interface appends an appropriate header to a packet received via one of the interfaces that cannot append headers to packets, even if the packet entered virtual network device cluster 402 via a different virtual network device sub-unit. For example, if interface P1 cannot append a header to a packet received from network device 120(1), and if the packet is forwarded to virtual network device sub-unit 122(2), interface V2 appends a header to the packet in response to receiving the packet. The header includes identifier "01" to indicate that the packet entered virtual network device cluster 402 via virtual network device sub-unit 122(1). Alternatively, if interface V1 of virtual network device 122(1) can append headers to packets exiting interface V1, interface V1 appends the header to the packet when the packet is being sent to virtual network device 122(2).

The association between an identifier and a packet is preserved as the packet is forwarded through virtual network device cluster 402. Thus, if a packet is received via port P1 and then forwarded to virtual network device sub-units 122(2) and 122(3), the header that includes identifier "01" will also be forwarded along with the packet throughout virtual network device cluster 402. When the packet exits the virtual network device cluster 402, the header is removed.

Each virtual network device sub-unit uses the identifiers to determine whether a packet can be sent via a particular interface. For example, interfaces coupled to virtual network device links, such as interfaces V1-V4, use the identifiers to determine whether a particular packet is allowed to be sent via that interface. If a packet, which is associated with identifier "01", is being sent via interface V2, interface V2 uses the header to detect that the packet has already been forwarded by virtual network device sub-unit 122(1). Accordingly, interface V2 can prevent the packet from looping back to virtual network device sub-unit 122(1) by filtering the packet from the packet flow being sent via interface V2.

FIG. 6B shows an example of ingress identifier (ID) settings and egress filters that can be used by each interface in virtual network device cluster 402 of FIG. 6A. In this example, it is assumed that headers, each containing an appropriate virtual network device sub-unit identifier, are appended to packets upon packet ingress. Additionally, if an interface cannot include an identifier in a packet, the header appended to that packet will have a value ("00" in this example) that indicates that a specific identifier value still needs to be associated with that packet.

In the embodiment of FIG. 6B, an interface will filter packets from the output flow being sent via that interface unless the identifier associated with that packet is on a list of "allowed" identifiers. It is noted that in an alternative embodiment, an interface can use a list of "not allowed" identifiers to filter packets from the output flow being sent via that interface.

The "ingress ID setting" column of the table shows the value of the virtual network device sub-unit identifier that will be associated with a packet received via a particular interface. As noted above, an identifier can be associated with a packet by appending a header that includes that identifier to the packet. As shown, the identifier "01" will be associated with packets received via interface P1. Identifier "02" will be associated with packets received via interface P2. Identifier "03" will be associated with packets received via interface P3. The association will be created either by the particular interface P1-P3 when that interface receives a packet or by another component, such as one of interfaces V1-V4 (e.g., as described below), if the receiving interface is not able to generate an appropriate header.

Packets received via the interface of virtual network device sub-unit 122(1) that is part of interface bundle IB1 will be associated with identifier "01". Similarly, packets received via the interface of virtual network device sub-unit 122(2) that is part of interface bundle IB1 will be associated with identifier "02".

Packets received via a virtual network device link will be associated with an identifier if a specific identifier value has not already been associated with those packets. In this example, if the identifier value "00" is associated with a packet, the value "00" indicates that a specific identifier value (i.e., a value that actually identifies a virtual network device sub-unit) needs to be associated with that packet. Value "00" is non-specific (in this example) because value "00" does not identify a particular one of virtual network device sub-units 122(1)-122(3).

A non-specific value can be associated with a packet if, for example, the association of identifiers with packets is performed by ingress interfaces and if some ingress interfaces are unable (e.g., because those ingress interfaces lack certain functionality) to associate a specific identifier value with a packet. For example, if interfaces P1-P3 are unable to generate specific identifier values, non-specific identifier value "00" will be associated with packets received via interfaces P1-P3. If a packet received via one of interfaces P1-P3 is forwarded to another virtual network device sub-unit, a specific identifier value will be associated with that packet when the packet is received via a virtual network device link. It is noted that, unlike specific identifier values "01", "02", and "03", non-specific identifier value "00" has a different meaning within each different virtual network device sub-unit. Additionally, non-specific identifier value "00" is only used to identify local interfaces within a given virtual network device sub-unit. The meaning of non-specific identifier value "00" (i.e., the interfaces identified by non-specific identifier value "00") is reassigned when transiting between chassis.

Thus, if a packet is associated with "00", the meaning of the identifier varies depending upon which virtual network device sub-unit is currently handling the packet. For example, the only packets that are associated with non-specific identifier value "00" within virtual network device sub-unit 122(1) (other than any such packets entering via interface V1, since those packets will be associated with a specific identifier by interface V1) are packets that entered virtual network device cluster 402 via virtual network device sub-unit 122(1). Similarly, the only packets that are associated with non-specific identifier "00" in virtual network device sub-unit 122(2) (again, other than any such packets entering via one of interfaces V2 or V3, since those packets will be associated with specific identifiers by interfaces V2 and V3) are those that entered virtual network device cluster 402 via virtual network device sub-unit 122(2). Finally, the only packets that are associated with non-specific identifier "00" in virtual network device sub-unit 122(3) (other than any such packets entering via one of interface V4, since those packets will be associated with specific identifiers by interface V4) are those that entered virtual network device cluster 402 via virtual network device sub-unit 122(3).

As shown in FIG. 6B, if interface V1 receives a packet that is associated with identifier value "00", interface V1 will associate that packet with identifier "02" to indicate that the packet entered virtual network device cluster 402 via virtual network device sub-unit 122(2). Similarly, if interface V2 receives a packet that is associated with identifier value "00", interface V2 associates the packet with identifier "01" to indicate that the packet originally entered virtual network device cluster 402 via virtual network device sub-unit 122(2). If interface V3 receives a packet associated with identifier "00", interface V3 will associate the packet with identifier "02". If interface V4 receives a packet associated with identifier "00", interface V4 will associate the packet with identifier "03". When interfaces V1-V3 receive packets that have already been associated with specific identifier values, interfaces V1-V3 will not update those specific identifier values.

The "egress filter" column of the table shows which packets are allowed to be sent via a particular interface. Packets that are not allowed to be sent via a particular interface will be filtered from the output flow being sent via that interface. In some embodiments, each interface within each virtual network device sub-unit 122(1)-122(3) uses a register to store this egress filtering information. The register stores a bitmap in which each bit is associated with one of the possible values of a virtual network device sub-unit identifier. When a packet is being output from an interface, the interface will use the identifier associated with the packet to select a bit within the register. For example, if the packet is associated with identifier value "02", the interface will select the bit associated with identifier value "02". The interface will filter the packet from the output flow being sent via that interface based on the value of the selected bit. For example, the interface will filter the packet from the output flow unless the bit associated with identifier value "02" is set to a particular value (e.g., one, in the table of FIG. 6B).

In this example, packets associated with identifiers "00", "01", "02", and "03" are allowed to be output via interfaces P1-P3. As this shows, packets are allowed to be output from these interfaces regardless of where those packets entered virtual network device cluster 402. This is appropriate, since each interface P1-P3 is the only interface coupling virtual network device cluster 402 to a particular network device. Accordingly, there is no risk that another interface in another virtual network device sub-unit will have already sent a packet to one of the network devices coupled to interfaces P1-P3. For example, since interface P3 is the only interface coupling virtual network device cluster 402 to network device 120(4), there is no way that virtual network device sub-units 122(1) and 122(2) can send packets to network device 120(4). Accordingly, interface P3 does not need to filter packets received via virtual network device sub-units 122(1) and 122(2) from the output stream being sent via interface P3.

There are two interfaces included in interface bundle IB1. Each of these interfaces has a different egress filter setting that is specific to the virtual network device sub-unit in which that interface is included. For example, the local interface included in virtual network device sub-unit 122(1) will allow packets associated with identifier values "00" and "01" to be sent, but will filter packets associated with identifier values "02" and "03". As this shows, the local interface in virtual network device sub-unit 122(1) will only send packets that entered virtual network device cluster 402 via virtual network device sub-unit 122(1). Similarly, the local interface in virtual network device sub-unit 122(2) will only send packets that entered virtual network device cluster 402 via virtual network device sub-units 122(2) and 122(3). By placing these restrictions on the packets allowed to be sent from each interface within interface bundle IB1, there is no chance that a copy of the same packet will be sent from both interfaces.

Interface V1 allows packets associated with identifiers "00" and "01" to be sent via virtual network device link 360(A). As this shows, interface V1 will send packets to virtual network device sub-unit 122(2) if those packets entered virtual network device cluster 402 via virtual network device sub-unit 122(1). However, interface V1 will not allow any packets to be sent back to virtual network device sub-unit 122(2) if those packets have already been forwarded by virtual network device sub-unit 122(2). As shown in FIG. 6A, the only way for a packet that entered virtual network device cluster 402 via virtual network device sub-units 122(2) or 122(3) to reach virtual network device sub-unit 122(1) is via virtual network device link 360(A). Accordingly, interface V1 filters packets associated with identifier values "02" and "03" from the output stream to prevent these packets from "looping" back to virtual network device sub-unit 122(2). For similar reasons, interface V4 filters packets associated with identifier values "02" and "01" from being output via interface V4.

Interface V2 filters packets associated with identifier "01" and allows other packets (associated with identifiers "00", "02", and "03") to be sent via interface V2 to virtual network device sub-unit 122(2). Thus, interface V2 will prevent packets that entered virtual network device cluster 402 via virtual network device unit 122(1) from looping back to virtual network device unit 122(1), but will allow packets that entered virtual network device cluster via virtual network device sub-units 122(2) and 122(3) to be sent to virtual network device sub-unit 122(1). Similarly, interface V3 allows packets associated with identifiers "00", "01", and "02" to be sent to virtual network device sub-unit 122(3) via virtual network device link 360(B), but prevents packets associated with identifier "03" from looping back to virtual network device sub-unit 122(3).

While the above example focuses on how virtual network device cluster 402 handles data packets, the same techniques can also be used to handle control packets that are sent between virtual network device sub-units 122(1)-122(3). For example, virtual network device sub-units 122(1)-122(3) can each perform Ethernet forwarding. Virtual network device sub-units 122(1)-122(3) send each other MAC notification messages in order to maintain consistency between forwarding tables maintained within each of the virtual network device sub-units. When a virtual network device sub-unit originally generates a MAC notification message, that MAC notification message is associated with a non-specific identifier value (e.g., "00" in the above example). If the MAC notification is sent to another virtual network device sub-unit, that virtual network device sub-unit then associates a specific identifier value with the MAC notification in the same way that a specific identifier is associated with a data packet. If virtual network device sub-unit 122(2) receives a MAC notification, which was generated by virtual network device sub-unit 122(1), associated with a non-specific identifier value via virtual network device link 360(A), virtual network device sub-unit 122(1) associates that MAC notification with identifier "01," If virtual network device sub-unit 122(2) then sends the MAC notification to virtual network device sub-unit 122(3), the association with identifier "01" is maintained. Thus, the identifier value associated with a MAC notification is set to a specific value that identifies the virtual network device sub-unit that generated the MAC notification. This identifier value is used to filter MAC notifications from certain interfaces in order to prevent looping within the virtual network device cluster.

In one embodiment, the ingress ID settings and egress filter values for each interface in virtual network device cluster 402 are generated by a centralized controller. For example, virtual network device sub-unit 122(1) can be designated the "primary" virtual network device sub-unit within virtual network device cluster 402. One of the tasks performed by the primary virtual network device sub-unit is the generation of ingress ID settings and egress filter values for each interface in virtual network device cluster 402. If the primary virtual network device sub-unit fails, one of the other virtual network device sub-units will assume the role of primary virtual network device sub-unit.

FIG. 6C illustrates an example of an interface 600 (which represents a port, uplink interface, or interface to a virtual network device link) of a virtual network device sub-unit. Interface 600 uses egress filter values to filter packet flows being sent from the virtual network device sub-unit via interface 600. As shown, interface 600 includes filter unit 610 and egress filter values store 620. Egress filter values store 620 stores egress filter values such as those shown in the "egress filter" column of FIG. 6B (e.g., as generated by a primary virtual network device sub-unit and provided to interface 600). Egress filter values store 620 can be a register, a memory location, or other storage area for storing appropriate egress filter values. Filter unit 610 uses information associated with each packet (e.g., such as a sub-unit identifier value) in conjunction with the egress filter values stored in egress filter values store 620 to determine whether each packet should be allowed to be output via the interface. Filter unit 610 receives an egress packet flow 650. Egress packet flow 650 is sent to interface 600 by a forwarding engine within the same virtual network device sub-unit as interface 600. If a given packet is allowed to be output from interface 600, filter unit 610 allows that packet to be output from interface 600 onto a link as part of filtered egress packet flow 660. If a given packet is not allowed to be output from interface 600, as determined based on the information associated with the packet and the information stored in egress filter values store 620), filter unit 610 inhibits the packet from being output via interface 600 (e.g., by dropping that copy of the packet) as part of filtered egress packet flow 660.

Interface 600 also includes ingress identifier (ID) value store 630 (e.g., a register or other storage area), and identifier unit 640. Ingress identifier value store 630 stores an identifier value that should be associated with an incoming packet as the packet enters the virtual network device sub-unit, if a specific identifier value has not already been associated with the incoming packet. Identifier unit 640 associates the value in ingress identifier value store 630 with each packet in ingress packet flow 670 that is not already associated with a specific ingress identifier. Accordingly, the packets in ingress packet flow 680 have each been associated with a specific identifier.

Figure 7:
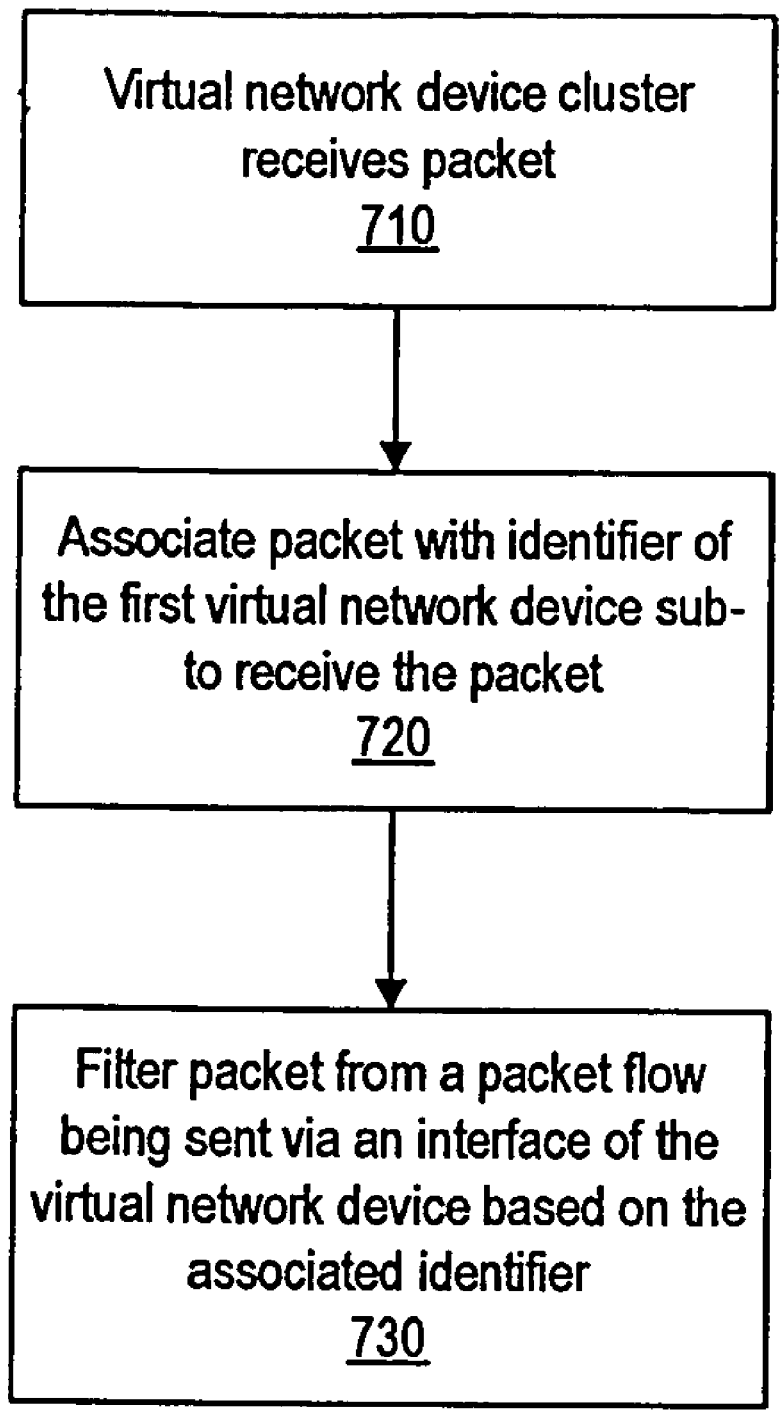
FIG. 7 is a flowchart illustrating the manner in which a packet is forwarded within a virtual network device cluster, according to one embodiment of the present invention.

FIG. 7 is a flowchart illustrating the manner in which a packet is forwarded within a virtual switch cluster. At 710, a virtual network device cluster receives a packet. As noted above, a virtual network device cluster includes several virtual network device sub-units that collectively act as a single logical device. A packet is received by the virtual network device cluster whenever one of the virtual network device sub-units included in that virtual network device cluster receives a packet from a device that is not part of the virtual network device cluster.

At 720, the packet is associated with the identifier of the first virtual network device sub-unit to receive the packet. In other words, the packet is associated with a value that identifies one of the virtual network device sub-units. The identified virtual network device sub-unit is the sub-unit via which the packet entered the virtual network device cluster. The identifier can be generated by the interface that first received the packet. Alternatively, the identifier can be generated by an interface that outputs the packet to another virtual network device sub-unit within the same virtual network device cluster. As another alternative, the identifier can be generated by an interface within another virtual network device sub-unit, which receives the packet from the identified virtual network device sub-unit.

Associating the packet with the identifier of the first virtual network device sub-unit to receive the packet can involve appending a header to the packet. The header includes the identifier of the appropriate virtual network device sub-unit.

At 730, the packet is filtered from a packet flow being sent via an interface of the virtual network device cluster based on the associated identifier. The packet is filtered from the packet flow dependent upon which virtual network device sub-unit is identified by the associated identifier. For example, the interface via which the packet is being sent can be part of an interface bundle that includes interfaces in more than one virtual network device. The interface filters packets that entered the virtual network device cluster via any virtual network device sub-unit other than the sub-unit that includes the interface in order to prevent multiple copies of the packet from being sent via the interface bundle.

In one embodiment, filtering the packet from the packet flow involves accessing a set of egress filter settings associated with an interface. For example, the egress filter settings for the interface can be stored in a register, which includes a bit for each possible identifier value that can be associated with a packet. The value of the bit indicates whether packets that are associated with a particular identifier value can be output from the interface. For example, if the identifier of the packet has value "01", and if the bit associated with identifier value "01" is set to a value of "1", the packet is allowed to be output from the interface. If the bit instead is instead cleared (i.e., if the value of the bit is zero), the packet cannot be output from the interface. Accordingly, the packet is filtered from the packet flow being output from the interface.

As noted above, various egress filter settings (used to determine whether a packet can be sent via a particular interface) are calculated in order to prevent packets from looping within a virtual network device cluster. These egress filter settings can be generated so that each packet follows a spanning tree within the virtual network device cluster. In one embodiment, a single spanning tree is calculated per virtual network device cluster. In other embodiments, several spanning trees are calculated per virtual network device cluster, as described below.

Multiple Spanning Trees per Virtual Network Device Cluster

In a virtual network device cluster, each virtual network device sub-unit presents a possible ingress point into the virtual network device cluster. Several different spanning trees can be calculated for the virtual network device cluster. Each spanning tree is associated with a different ingress point (or with a different set of ingress points) than each other spanning tree. As a packet enters the virtual network device cluster via a particular ingress point, information identifying that ingress point is associated with the packet. For example, a virtual network device sub-unit identifier can be associated with the packet, as described above. The packet is then forwarded through the virtual network device cluster in a manner that is consistent with the spanning tree associated with the ingress point via which the packet entered the virtual network device cluster. Forwarding the packet according to a spanning tree prevents the packet from "looping" within the virtual network device cluster, since the spanning tree blocks all but one of the paths between a given pair of virtual network device sub-units.

FIGS. 8A-8D each show a different spanning tree that is used to convey packets through the virtual network device cluster of FIG. 4. In FIGS. 8A-8D, virtual network device cluster 402 includes four virtual network device sub-units 122(1)-122(4). Virtual network device link 360(A) couples virtual network device sub-units 122(1) and 122(2). Virtual network device link 360(B) couples virtual network device sub-units 122(2) and 122(4). Virtual network device link 360 (C) couples virtual network device sub-units 122(3) and 122(4). Virtual network device link 360(D) couples virtual network device sub-units 122(3) and 122(1).

Figure 8A:
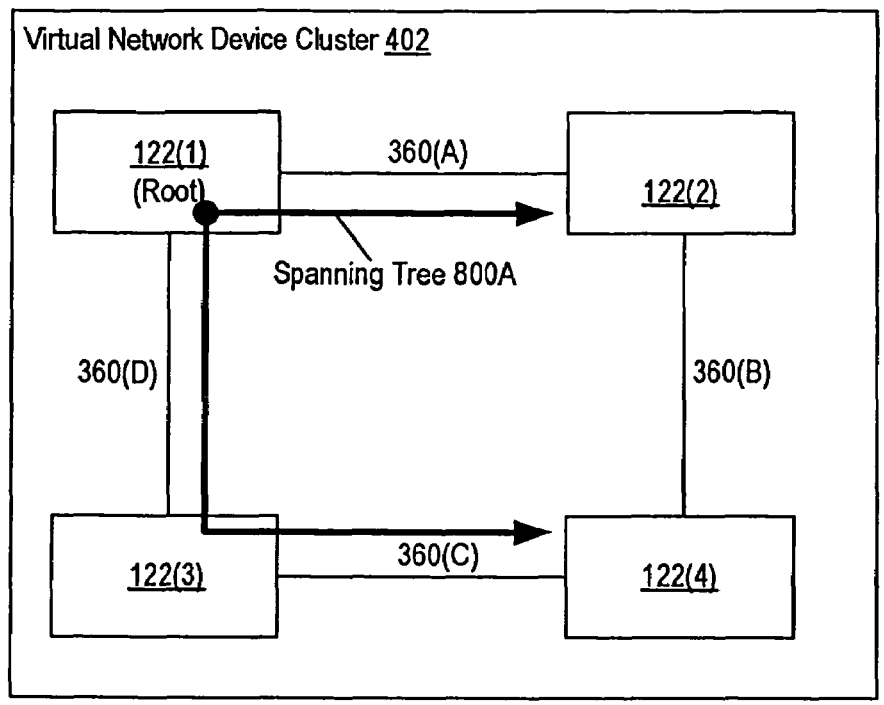
FIGS. 8A-8D show how a different spanning tree is calculated for each virtual network device sub-unit within the same virtual network device cluster, according to one embodiment of the present invention.

FIG. 8A shows spanning tree 800A. Virtual network device sub-unit 122(1) is the root of spanning tree 800A. In this example, spanning tree 800A is used to convey packets that enter virtual network device cluster 402 via virtual network device sub-unit 122(1). The spanning tree used to convey packets that enter via a particular ingress point is described as being associated with that ingress point. Thus, spanning tree 800A is associated with virtual network device sub-unit 122(1).

Using spanning tree 800A involves determining whether a packet can be conveyed via a particular interface based on whether that interface is blocked by the spanning tree. The arrows used to represent spanning tree 800A show the paths in which a packet (which entered virtual network device cluster 402 via virtual network device sub-unit 122(1)) can be conveyed, via non-blocked interfaces. When a virtual network device sub-unit forwards and/or routes a given packet, the packet will be sent to one or more interfaces within that virtual network device sub-unit based on the outcome of the forwarding or routing. Spanning tree 800A is then used to determine whether that packet will be output from each of the interfaces to which the packet was sent. In one embodiment, each interface that is coupled to a virtual network device link is programmed to filter packets (which entered virtual network device cluster 402 via virtual network device sub-unit 122(1)) from that interface's output stream so that the packets will only be conveyed along spanning tree 800A. For example, sending packets via virtual network device link 360(B) is not consistent with spanning tree 800A. Accordingly, the interface within virtual network device sub-unit 122(2) that is coupled to virtual network device link 360(B) will filter all packets that entered via a virtual network device sub-unit 122(1) from that interface's output stream.

As shown, packets entering via virtual network device sub-unit 122(1) are forwarded to virtual network device sub-unit 122(2) via virtual network device link 360(A), to virtual network device sub-unit 122(3) via virtual network device link 360(D), and to virtual network device sub-unit 122(4) via virtual network device links 360(D) and 360(C). However, packets that entered virtual network device cluster 402 via virtual network device sub-unit 122(1) are not conveyed via virtual network device link 360(B). Additionally, packets that enter via virtual network device sub-unit 122(1) can only be conveyed in the direction shown by the arrows in FIG. 8A. Thus, packets that enter virtual network device cluster 402 via virtual network device sub-unit 122(1) cannot be sent back to virtual network device sub-unit 122(1) by another virtual network device sub-unit 122(2)-122(3). By blocking the use of virtual network device link 360(B) and preventing packets from being sent back to virtual network device sub-unit 122(1) via the other virtual network device links 360(A), 360(C), and 360(D), loops are prevented (at least for packets entering virtual network device cluster 402 via virtual network device sub-unit 122(1)). It is noted that spanning tree 800A is not used to determine whether packets can be conveyed via interfaces other than those interfaces coupled to virtual network device links.

Figure 8B:
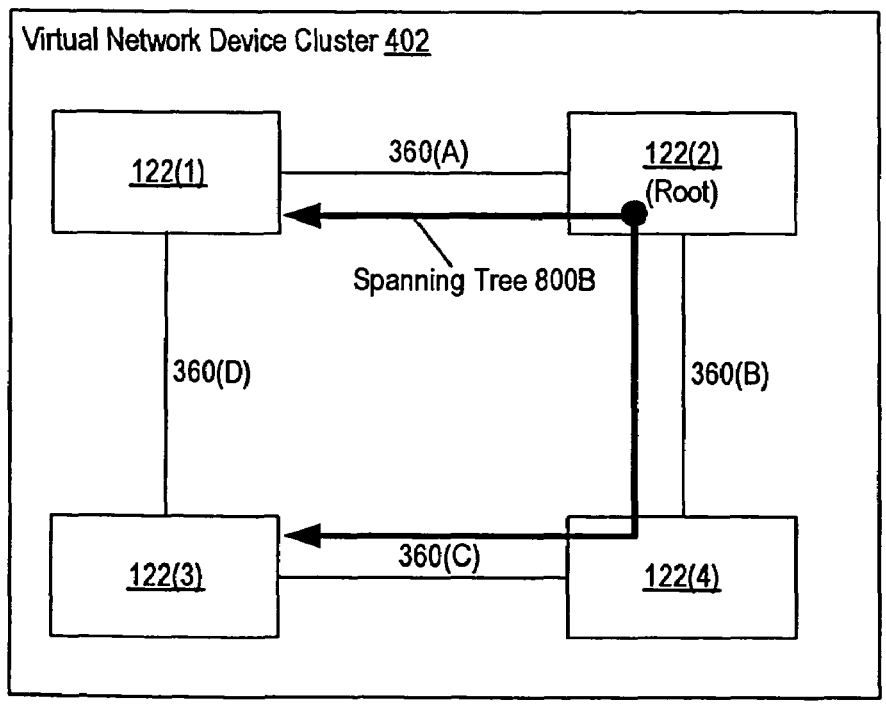

FIG. 8B illustrates spanning tree 800B, which is used to convey packets that enter virtual network device cluster 402 via virtual network device sub-unit 122(2). Virtual network device sub-unit 122(2) is the root of spanning tree 800B. As shown, packets entering via virtual network device sub-unit 122(2) can be forwarded to virtual network device sub-unit 122(1) via virtual network device link 360(A), to virtual network device sub-unit 122(4) via virtual network device link 360(B), and to virtual network device sub-unit 122(3) via virtual network device links 360(B) and 360(C). However, packets that entered virtual network device cluster 402 via virtual network device sub-unit 122(2) are not conveyed via virtual network device link 360(D). In the same way that spanning tree 800A prevents packets that enter via virtual network device sub-unit 122(1) from looping within virtual network device cluster 402, spanning tree 800B prevents packets that enter via virtual network device sub-unit 122(2) from looping.

Figure 8C:
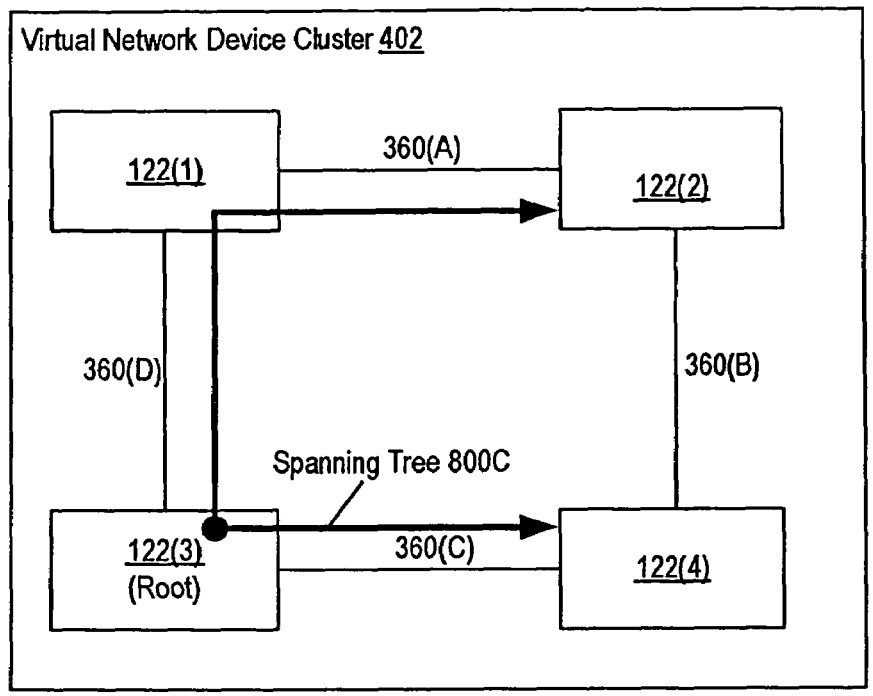

FIG. 8C shows spanning tree 800C. Spanning tree 800C is used to convey packets that enter virtual network device cluster 402 via virtual network device sub-unit 122(3). Virtual network device sub-unit 122(3) is the root of spanning tree 800C. Packets entering via virtual network device sub-unit 122(3) can be forwarded to virtual network device sub-unit 122(1) via virtual network device link 360(D), to virtual network device sub-unit 122(4) via virtual network device link 360(C), and to virtual network device sub-unit 122(2) via virtual network device links 360(D) and 360(A). However, packets that entered virtual network device cluster 402 via virtual network device sub-unit 122(3) are not conveyed via virtual network device link 360(B). Spanning tree 800C prevents packets that enter via virtual network device sub-unit 122(3) from looping. It is noted although spanning trees 800A and 800C are similar in some ways (both prevent packets entering via a respective ingress point from being sent via virtual network device link 360(B) and each allow packets to be conveyed on the other virtual network device links), spanning trees 800A and 800C have several differences that arise due the use of a different root in each spanning tree. For example, a packet being conveyed according to spanning tree 800C can be conveyed from virtual network device sub-unit 122(3) to virtual network device sub-unit 122(1) via virtual network device link 360(D), but a packet being conveyed according to spanning tree 800D cannot be conveyed along that path.

Figure 8D:
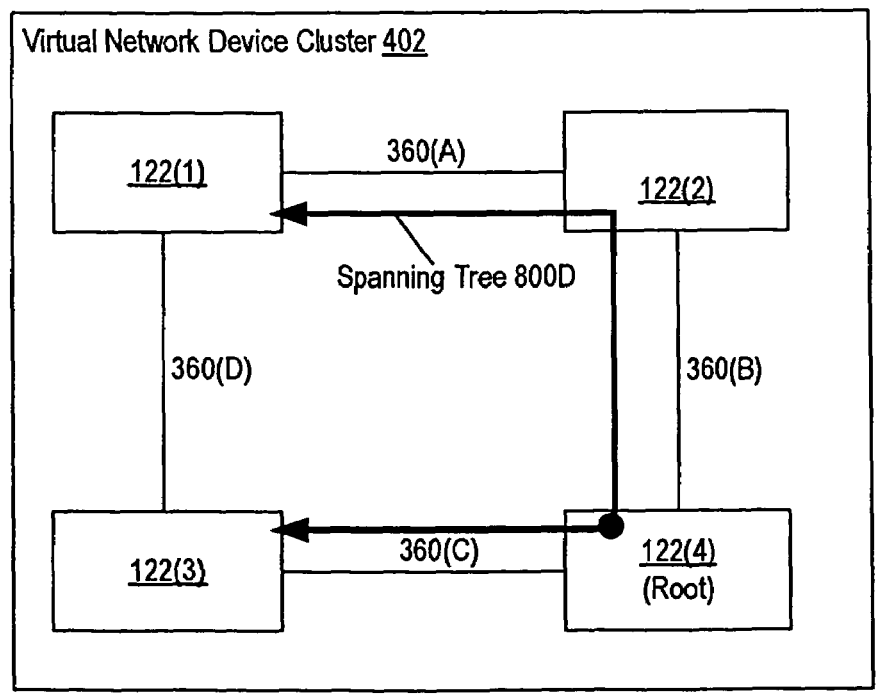

FIG. 8D illustrates spanning tree 800D, which is used to convey packets that enter virtual network device cluster 402 via virtual network device sub-unit 122(4). Virtual network device sub-unit 122(4) is the root of spanning tree 800D. Packets entering via virtual network device sub-unit 122(4) can be forwarded to virtual network device sub-unit 122(3) via virtual network device link 360(C), to virtual network device sub-unit 122(2) via virtual network device link 360(B), and to virtual network device sub-unit 122(1) via virtual network device links 360(B) and 360(A). However, packets that entered virtual network device cluster 402 via virtual network device sub-unit 122(4) are not conveyed via virtual network device link 360(D). Spanning tree 800D prevents packets that enter via virtual network device sub-unit 122(4) from looping.

Each spanning tree 800A-800D is a minimum spanning tree for the ingress point with which that spanning tree is associated. A minimum spanning tree is a spanning tree in which a packet is sent from the ingress point to each possible egress point using the shortest possible path. In this example, the possible egress points include any of virtual network device sub-units 122(1)-122(4) within virtual network device cluster 402. By using a different spanning tree for each ingress point, a packet entering via any ingress point will be forwarded via a minimum spanning tree. This provides better efficiency than would be possible if a single spanning tree was used to forward all packets entering virtual network device sub-unit 122(1). For example, if spanning tree 800A was used to forward all packets entering virtual network device cluster 402, a packet that entered via virtual network device sub-unit 122(4) and was being forwarded to virtual network device sub-unit 122(2) would have to be forwarded to the root of spanning tree 800A, which is virtual network device 122(1), and then to virtual network device 122(2) via spanning tree 800A (i.e., via virtual network device link 360(A)). This would result in the packet being sent via three hops (virtual network device links 360(C), 360(D), and 360(A)), when the shortest path between the ingress point and egress point was one hop (virtual network device link 360(B)). In contrast, if spanning tree 800D is used to convey packets received via virtual network device link 122(4), the packet described above will be conveyed along the shortest path.

As noted above, in some embodiment, one virtual network device sub-unit, referred to as the primary virtual network device sub-unit, calculates all of the spanning trees to be used within virtual network device cluster 402. The spanning trees are calculated using a spanning tree algorithm such as Prim's, Kruskal's, or Dijkstra's algorithm (it is noted that the spanning tree calculation can be performed without implementing the spanning tree protocol). In some embodiments, each virtual network device link within the virtual network device cluster is assigned a weight. The weight assigned to a virtual network device link is based on the bandwidth of the virtual network device link. The primary virtual network device sub-unit uses the assigned weights in the spanning tree calculation. In one embodiment, the primary virtual network device sub-unit adjusts the weights slightly before calculating each spanning tree in order to ensure proper load distribution among the virtual network device links.

In other embodiments, instead of having one virtual network device sub-unit calculate all of the spanning trees, each virtual network device sub-unit calculates the spanning tree for that individual virtual network device unit. For example, virtual network device sub-unit 122(1) calculates spanning tree 800A, virtual network device sub-unit 122(2) calculates spanning tree 800B, and so on. Each virtual network device sub-unit can calculate the individual spanning tree for that virtual network device sub-unit by running spanning tree protocol with that virtual network device sub-unit as the root. For example, virtual network device sub-unit 122(1) calculates spanning tree 800A by running spanning tree protocol with virtual network device sub-unit 122(1) as the root. Once the spanning tree has been calculated, each virtual network device sub-unit then calculates the appropriate egress filter settings for that spanning tree and distributes those egress filter settings to the other virtual network device sub-units within the virtual network device.

In some embodiments, packets are conveyed according to the different spanning trees by using egress filter settings, such as those shown in FIG. 6B, for each interface that is coupled to a virtual network device link. After a spanning tree is calculated for each ingress point, the egress filter settings for each interface within virtual network device cluster 402 are calculated such that packets entering via a given ingress point are conveyed in a manner that is consistent with the spanning tree associated with that ingress point. The egress filter settings for a given interface include information that indicates whether a packet that entered the virtual network device cluster via a particular ingress point can be output from that interface. For example, if the spanning tree associated with the particular ingress point blocks the interface, the egress filter settings for that interface will indicate that packets entering via that particular ingress point cannot be output from that interface.

Each packet is associated with an identifier value, which identifies the packet's ingress point, using one of the techniques described above. These identifier values and egress filter settings are then used to determine whether a particular packet can be forwarded from a given interface. If a packet is sent to an interface, the interface will output the packet if the egress filter settings for that interface indicate that packets having the packet's ingress point (as identified by the identifier value associated with the packet) are allowed to be output from that interface. It is noted that, at least in embodiments where each spanning tree is associated with a single ingress point, the unique identifiers used to identify a packet's ingress point also identify a particular spanning tree (i.e., the spanning tree associated with the identified ingress point).

As an example of how egress filter settings can be used to forward a packet according to a particular spanning tree, a forwarding engine within virtual network device sub-unit 122(3) sends a packet to the interface coupled to virtual network device link 360(C). The interface accesses the identifier value associated with the packet to determine the packet's ingress point into virtual network device cluster 402. If the packet's ingress point was virtual network device sub-unit 122(2), the packet is being sent according to spanning tree 800B. Accordingly, the egress settings for the interface will indicate that the packet should not be output via that interface, and the interface will responsively filter the packet from the packet flow being sent via the interface. If instead the packet's ingress point was virtual network device sub-unit 122(1) (and thus the packet is being sent in a manner consistent with spanning tree 800A), the packet will not be filtered from the packet flow being sent via the interface. Instead, the packet is allowed to be output from the interface, since sending the packet via virtual network device link 360(C) is consistent with spanning tree 800A.

In one embodiment, when a particular virtual network device sub-unit forwards a packet, the packet is sent to interfaces in all possible paths for the various spanning trees that traverse the particular virtual network device sub-unit. The egress filter settings are then used to prevent the packet from being sent via interfaces other than the interfaces in the appropriate spanning tree for the packet, given the ingress point via which the packet entered the virtual network device cluster.

In some embodiments, upon the failure of any virtual network device link, each of the non-primary virtual network device sub-units (i.e., each virtual network device sub-unit that is not responsible for spanning tree calculation) that are coupled to the failed virtual network device link reports the failed link to the primary virtual network device sub-unit (or to all other reachable virtual network device sub-units). While some virtual network device sub-units coupled to the failed link may not be able to communicate with the primary virtual network device sub-unit subsequent to the failure, the virtual switch cluster is ideally configured so that at least one of the virtual network device sub-units coupled to the failed link will still be able to communicate with the primary virtual network device sub-unit subsequent to the failure.

Upon receiving a failure notification, the primary virtual network device sub-unit recalculates all of the affected spanning trees. The primary virtual network device sub-unit then updates the egress filter settings within the virtual network device cluster (if needed) so that the egress filter settings are consistent with the recalculated spanning trees. In order to avoid causing any virtual network device sub-unit to be unable to communicate with the primary virtual network device sub-unit while the egress filter settings are being updated, the primary virtual network device sub-unit updates the egress filter settings of the closest (e.g., in terms of the number of virtual network device links) virtual network device sub-units before updating the egress filter settings of virtual network device sub-units that are farther away. For example, assume the spanning tree of FIG. 8A is calculated subsequent to a link failure and that virtual network device sub-unit 122(1) is the primary virtual network device sub-unit. Virtual network device sub-unit 122(1) updates egress filter settings within virtual network device sub-unit 122(1) first. Then, virtual network device sub-unit 122(1) updates egress filter settings within virtual network device sub-units 122(2) and 122(3), which can each be reached via one virtual network device link by primary virtual network device sub-unit, according to spanning tree 800A. Finally, virtual network device sub-unit 122(1) updates egress filter settings within virtual network device sub-unit 122(4), which can be reached via two virtual network device links by primary virtual network device sub-unit 122(1). The primary virtual network device sub-unit updates devices at the same "depth" of spanning tree 800A in parallel (e.g., virtual network device sub-units 122(2) and 122(3), which are each one virtual network device link away from the primary virtual network device sub-unit 122(1) in spanning tree 800A, can be updated in parallel). It should be noted that, in one embodiment, the primary virtual network device sub-unit only modifies the egress filter settings that need modification to be consistent with the recalculated spanning trees. It is also noted that similar functions can be performed by more than one virtual network device sub-unit in response to a failure (e.g., if spanning tree calculation is distributed among the virtual network device sub-units instead of being performed by a single primary virtual network device sub-units).

In some embodiments, virtual network device sub-units 122(1)-122(4) perform Ethernet forwarding. As part of performing Ethernet forwarding, a virtual network device sub-unit "learns" a Media Access Control (MAC) address by associating the MAC address with information identifying one or more interfaces. For example, an Ethernet network device learns a MAC address by allocating an entry to that MAC address in a forwarding table. The entry includes information identifying the interface(s) that are associated with the MAC address. If a virtual network device sub-unit has learned a particular MAC address, the virtual network device sub-unit will forward packets addressed to that MAC address to the associated interface(s). Otherwise, if the MAC address has not been learned, the virtual network device sub-unit will flood the packet to all of the interfaces (other than the interface via which the packet was received) in the VLAN in which the packet is being conveyed.

A virtual network device sub-unit associates a MAC address with an interface in response to receiving a packet having that MAC address as a source address. Typically, an Ethernet device will associate the source address of a packet with the interface via which that packet was received. However, in virtual network device clusters that implement several different spanning trees, each virtual network device sub-unit learns the source address of a packet received via a virtual network device link in a different manner. Instead of associating the packet's source address with the interface to the virtual network device link, the virtual network device sub-unit will associate the packet with the interface via which the packet originally entered the virtual network device cluster. Information identifying this interface can be carried in a header appended to the packet.

Figure 9A:
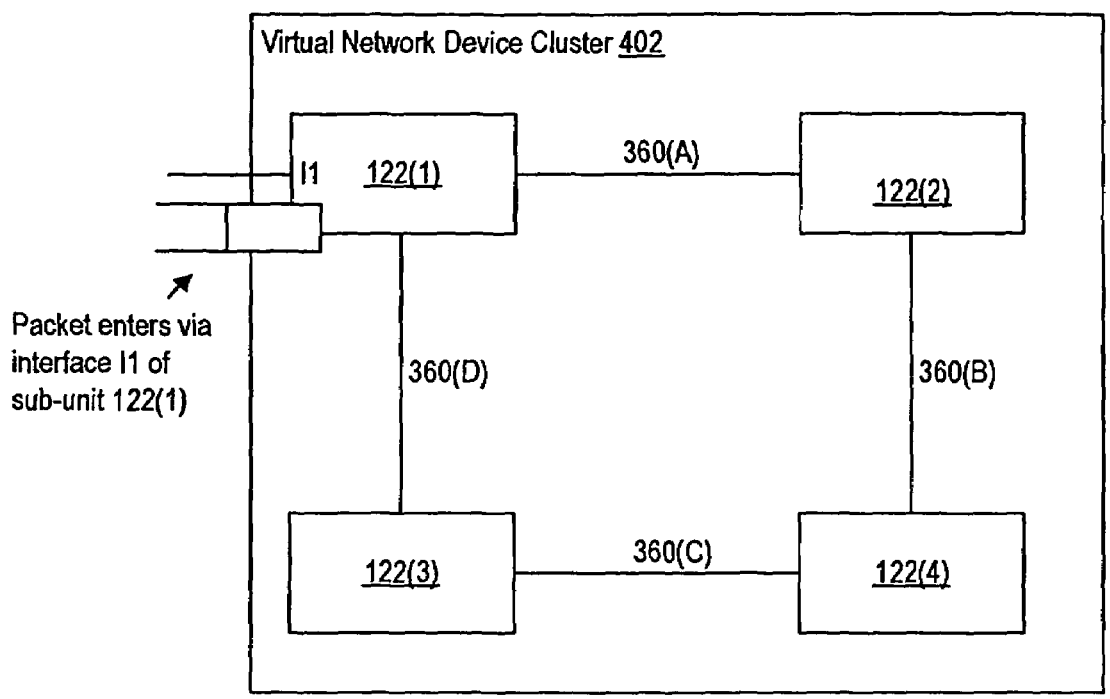
FIGS. 9A-9C illustrate how a packet will be forwarded through the virtual network device cluster of FIGS. 8A-8D.
Figure 9B:
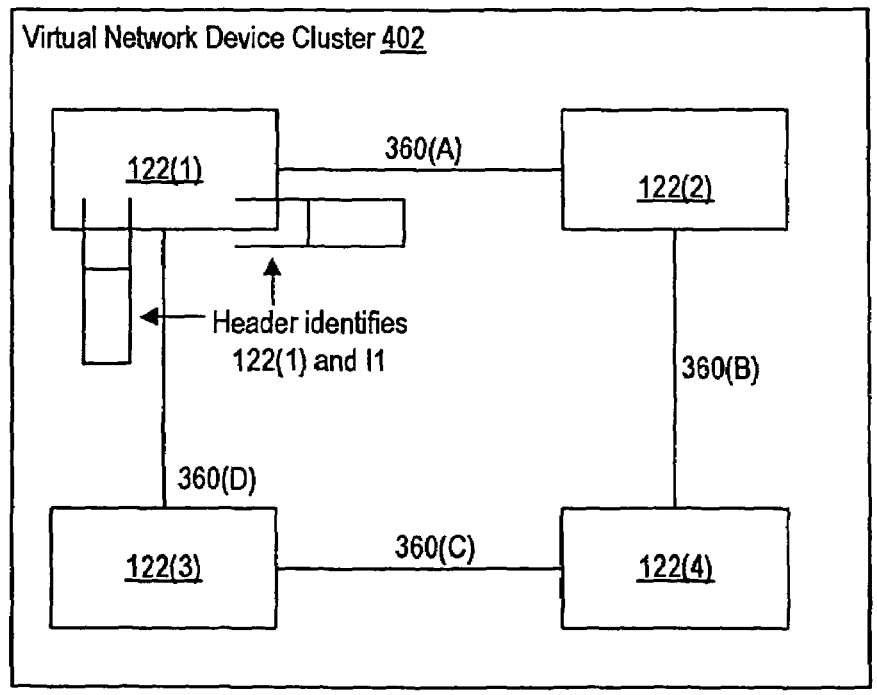
Figure 9C:
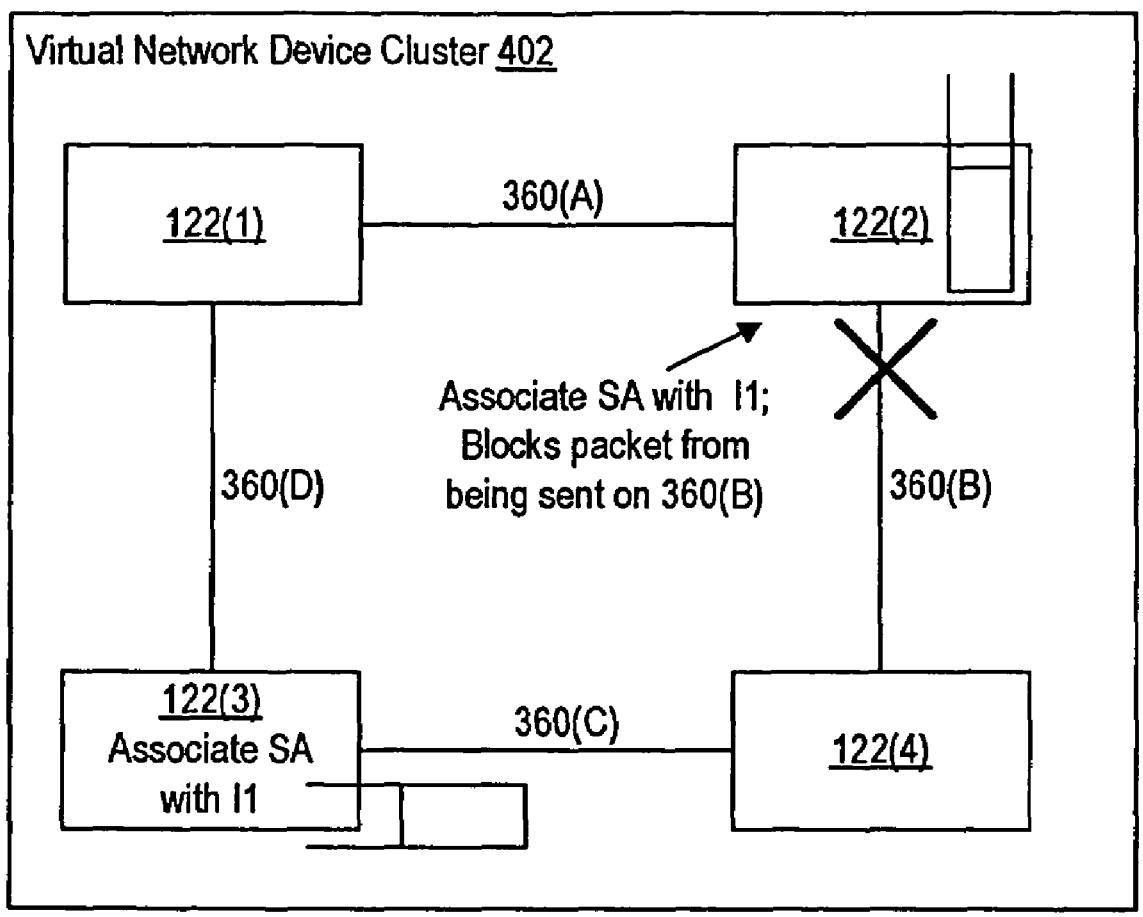

FIGS. 9A-9C illustrate how a packet is sent through virtual network device cluster 402 of FIGS. 8A-8D. As shown in FIG. 9A, a packet enters virtual network device cluster 402 via interface I1 of virtual network device sub-unit 122(1). Interface I1 (or another component of virtual network device cluster 402) appends a header to the packet. The header includes information identifying interface I1 as the interface that received the packet. The header also includes information identifying virtual network device sub-unit 122(1) as the ingress point via which the packet entered virtual network device sub-unit 122(1). The information identifying virtual network device sub-unit 122(1) is included in the header by interface I1, in this example. In other embodiments, that information can be included in the header by another component (such as the interfaces, which are included in virtual network device sub-units 122(2) and 122(3), to virtual network device links 360A and 360D) within virtual network device cluster 402.

In this example, the packet is being flooded, and flooded packets are sent to each virtual network device sub-unit within virtual network device cluster 402. Since the packet entered virtual network device cluster 402 via virtual network device sub-unit 122(1), the packet is forwarded according to spanning tree 800A (as shown in FIG. 8A). As shown in FIG. 9B, a forwarding engine within virtual network device sub-unit sends the packet and the appended header to interfaces coupled to virtual network device links 360(A) and 360(D). The egress filter settings for each interface indicates that the packet can be output from that interface, given that the ingress point of the packet is virtual network device sub-unit 122(1). Accordingly, the packet is output to virtual network device sub-units 122(2) and 122(3) via virtual network device links 360(A) and 360(D) respectively, as is consistent with spanning tree 800A.

In FIG. 9C, virtual network device sub-unit 122(2) has extracted the information identifying interface I1 from the header appended to the packet and associated the source address (SA) of the packet with interface I1 (instead of associating the source address with the interface coupled to virtual network device link 360(A)). Similarly, virtual network device sub-unit 122(3) has associated the source address (SA) of the packet with interface I1 (instead of associating the source address with the interface coupled to virtual network device link 360(D)). If I1 is part of an interface bundle that also includes at least one interface in each virtual network device sub-unit 122(2) and 122(3), virtual network device sub-unit 122(2) and 122(3) will forward subsequent packets addressed to SA via local interfaces within the interface bundle based on the association between SA and I1 (instead of forwarding such packets to virtual network device sub-unit 122(1)).

As shown in FIG. 9C, a forwarding engine within virtual network device sub-unit 122(3) sends the packet to the interface coupled to virtual network device link 360(C). The egress filter settings for this interface indicate that packets, which entered virtual network device cluster 402 via virtual network device sub-unit 122(1), are allowed to be output from that interface. Accordingly, the packet and the appended header are output to virtual network device sub-unit 122(4) via virtual network device link 360(C), as is consistent with spanning tree 800A.

A forwarding engine within virtual network device sub-unit 122(2) sends the packet to the interface coupled to virtual network device link 360(B). However, the interface filters the packet from the packet flow being sent via virtual network device link 360(B) in response to the information (in the header appended to the packet) indicating that the packet entered virtual network device cluster 402 via virtual network device sub-unit 122(1). Accordingly, the packet is blocked from being sent via virtual network device link 360(B), as is consistent with spanning tree 800A.

In the above examples, only one spanning tree is calculated per ingress point into virtual network device cluster 402. However, in other embodiments, multiple spanning trees are calculated per ingress point (e.g., several spanning trees, each having virtual network device sub-unit 122(1) as a root, can be calculated and used within virtual network device cluster 402). If N spanning trees are calculated per ingress point, N sets of egress filter settings are maintained at each interface. An algorithm (e.g., a hash-based algorithm) selects a value of N for each packet. In one embodiment, use of the algorithm load-balances traffic among the paths defined by the different spanning trees.

It is also noted that in some embodiments, different spanning trees are not calculated for each ingress point. For example, in one embodiment, a virtual network device cluster includes eight ingress points, ingress points 1-8 (each ingress point is a different virtual network device sub-unit). Four different spanning trees A-D are calculated for the virtual network device cluster. Each of the four spanning trees is associated with two of the ingress points. For example, spanning tree A is associated with ingress points 1 and 2, spanning tree B is associated with ingress points 3 and 4, spanning tree C is associated with ingress points 5 and 6, and spanning tree D is associated with ingress points 7 and 8. Packets received via a particular ingress point are then forwarded through the virtual network device cluster in a manner consistent with the associated spanning tree. For example, a packet received via ingress point 7 will be forwarded according to spanning tree D. Similarly, a packet received via ingress point 8 will also be forwarded in a manner consistent with spanning tree D. Packets received via ingress points 5 and 6 are forwarded according to spanning tree C. Packets received via either ingress point 3 or ingress point 4 will similarly be forwarded in a manner that is consistent with spanning tree B. Packets received via ingress points 1 and 2 are forwarded in a manner that is consistent with spanning tree A.

Each virtual network device sub-unit can include one or more interfaces that are similar to interface 600 of FIG. 6C. For example, in one embodiment, each interface includes a filtering unit and an egress filter values store coupled to the filtering unit. The egress filter values store stores several egress filter values, each of which identifies whether the interface is blocked by a respective one of the spanning trees. For example, the egress filter values in the egress filter values store can identify whether the interface is blocked by a first spanning tree, which is associated with a first ingress point, and whether the interface is blocked by a second spanning tree, which is associated with a second ingress point.

Multiple Spanning Trees per Network

Environments other than virtual network device clusters can use multiple spanning trees in the same way as a virtual network device cluster uses multiple spanning trees. FIGS. 10A-10D show a network in which a different spanning tree is calculated for each ingress point into the network. In FIGS. 10A-10D, network 1000 includes four network devices 1022(1)-1022(4) (it is noted that other embodiments can include different numbers of network devices than are shown here). Link 1060(A) couples network device 1022(1) to network device 1022(2). Link 1060(B) couples network device 1022(2) to network device 1022(4). Link 1060(C) couples network device 1022(4) to network device 1022(3). Link 1060(D) couples network device 1022(3) to network device 1022(1). It is noted that a virtual network device cluster can be considered an example of a network in which a different spanning tree is calculated for each ingress point into a network. The techniques described above with respect to virtual network device clusters apply to other networks that implement multiple spanning trees.

Figure 10A:
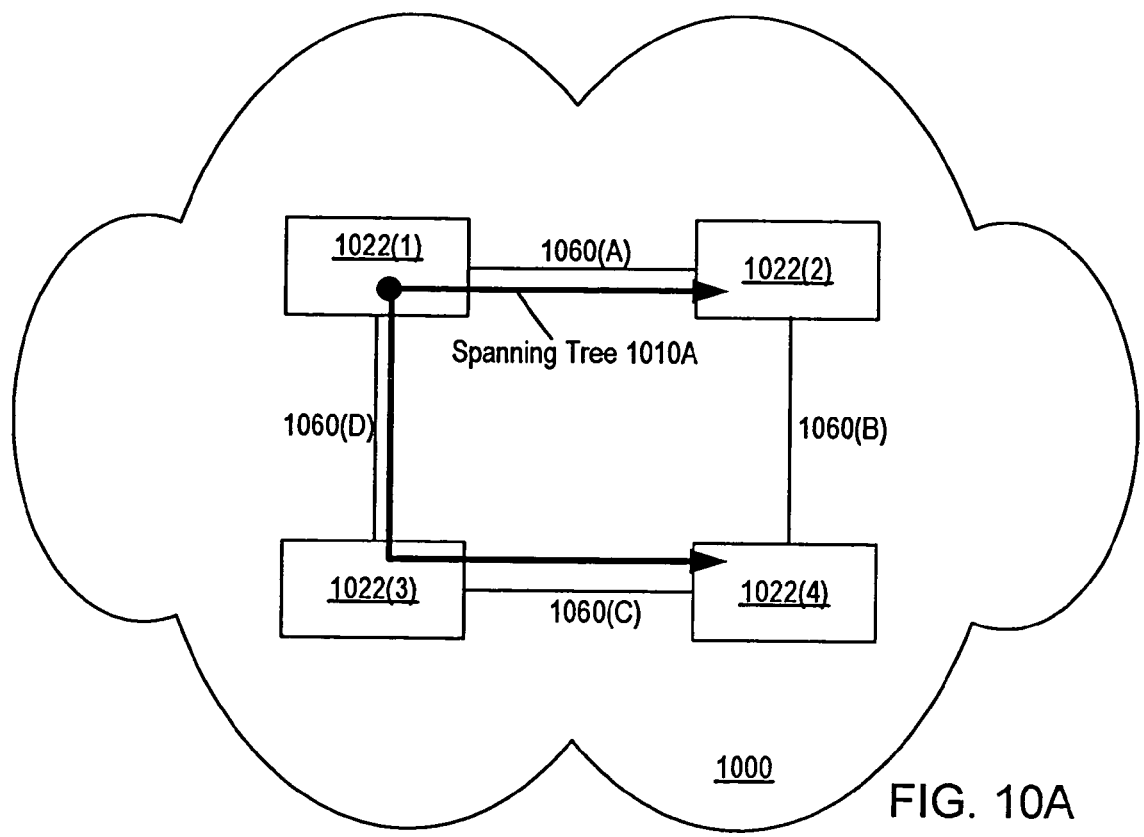
FIGS. 10A-10D show a network in which a different spanning tree is calculated for each ingress point, according to one embodiment of the present invention.

FIG. 10A shows spanning tree 1010A. Network device 1022(1) is the root of spanning tree 1010A. In this example, spanning tree 1010A is used to convey packets that enter network 1000 via network device 1022(1). Throughout this discussion, the spanning tree used to convey packets entering network 1000 via a particular ingress point is described as being associated with that ingress point. Thus, spanning tree 1010A is associated with network device 1022(1).

Using spanning tree 1010A involves determining whether a packet is allowed to be conveyed via a particular interface of one of the network devices within network 1000 based on whether that interface is blocked by the spanning tree. The arrows used to represent spanning tree 1010A show the paths in which a packet can be conveyed via non-blocked interfaces. When a network device forwards and/or routes a given packet, the packet will be sent to one or more interfaces within that network device based on the outcome of the forwarding or routing. Spanning tree 1010A is then used to determine whether that packet will be output from each of the interfaces to which the packet was sent. In one embodiment, each interface is programmed to filter packets from that interface's output stream such that packets that entered network 1000 via network device 1022(1) will only be conveyed along spanning tree 1010A.

As shown, packets entering via network device 1022(1) can be forwarded to network device 1022(2) via link 1060(A), to network device 1022(3) via link 1060(D), and to network device 1022(4) via links 1060(D) and 1060(C). However, packets that entered network 1000 via network device 1022(1) are not conveyed via link 1060(B). Additionally, packets that enter via network device 1022(1) can only be conveyed in the direction shown by the arrows in FIG. 10A. Thus, packets that enter network 1000 via network device 1022(1) cannot be sent back to network device 1022(1) by another network device 1022(2)-1022(3). By blocking the use of link 1060(B) and preventing packets from being sent back to network device 1022(1) via the other links 1060(A), 1060(C), and 1060(D), loops are prevented (at least for packets entering network 1000 via network device 1022(1)). It is noted that spanning tree 1010A is not used to determine whether packets can be conveyed via interfaces other than those interfaces coupled to links that connect network devices 1022(1)-1022(4) with each other. Additionally, spanning tree 1010A is not used to determine whether packets having ingress points other than network device 1022(1) can be output from a particular interface.

Figure 10B:
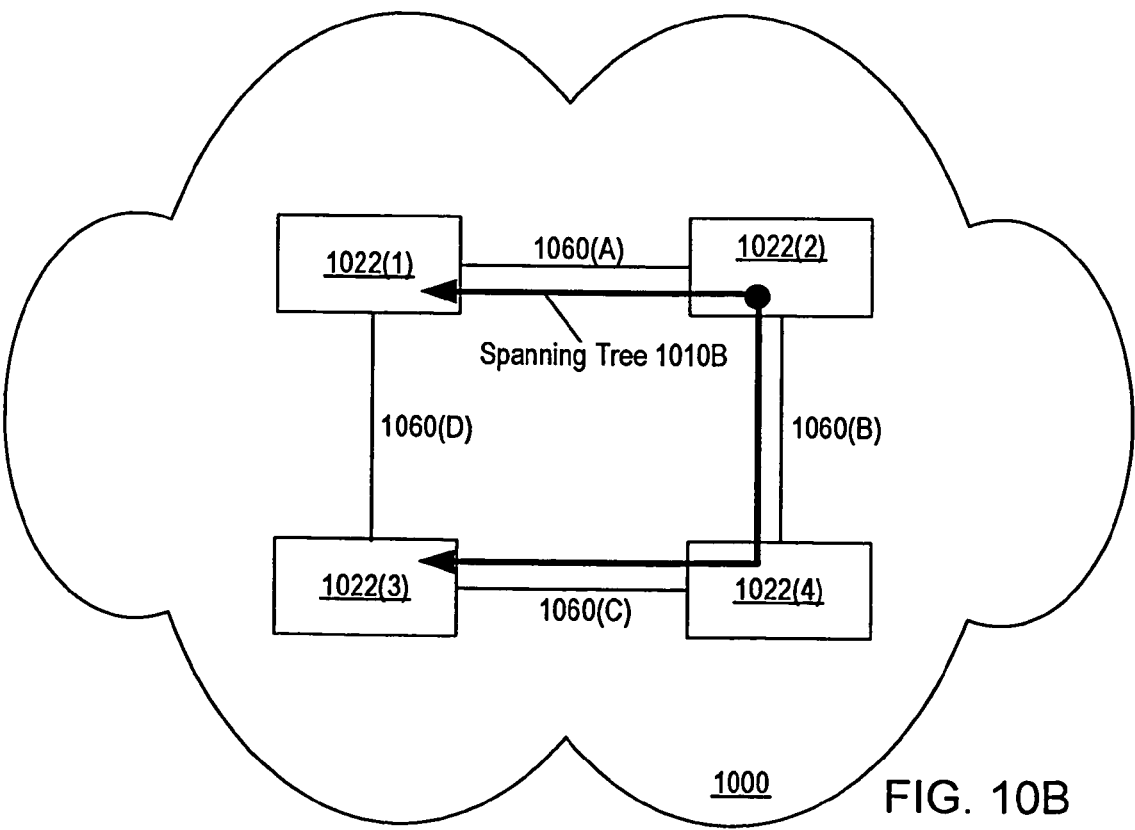

FIG. 10B illustrates spanning tree 1100B, which is used to convey packets that enter network 1000 via network device 1022(2). Network device 1022(2) is the root of spanning tree 1100B. As shown, packets entering via network device 1022(2) are allowed to be forwarded to network device 1022(1) via link 1060(A), to network device 1022(4) via link 1060(B), and to network device 1022(3) via links 1060(B) and 1060(C). However, packets that entered network 1000 via network device 1022(2) are not conveyed via link 1060(D). In the same way that spanning tree 1010A prevents packets that enter via network device 1022(1) from looping within network 1000, spanning tree 1010B prevents packets that enter via network device 1022(2) from looping within network 1000.

Figure 10C:
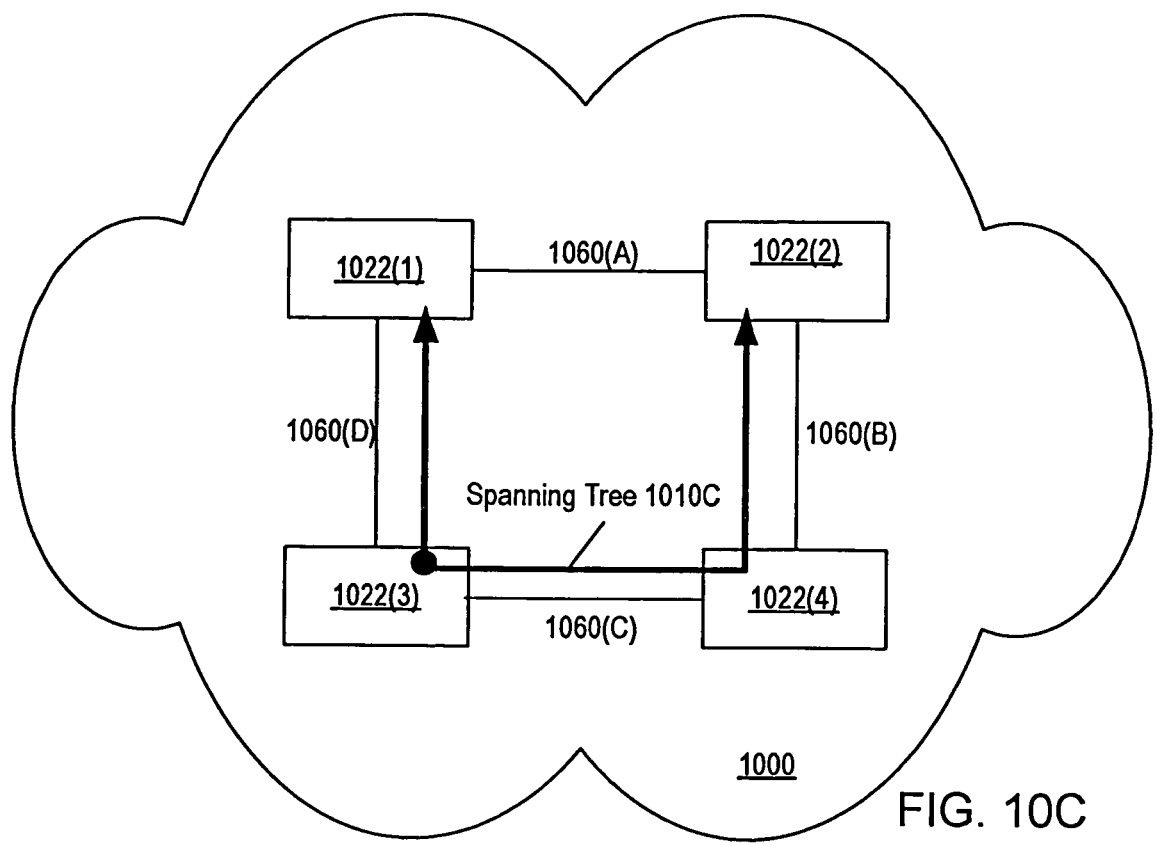

FIG. 10C shows spanning tree 1010C. Spanning tree 1010C is used to convey packets that enter network 1000 via network device 1022(3). Network device 1022(3) is the root of spanning tree 1010C. Packets entering via network device 1022(3) are allowed to be forwarded to network device 1022(1) via link 1060(D), to network device 1022(4) via link 1060(C), and to network device 1022(2) via links 1060(C) and 1060(B). However, packets that entered network 1000 via network device 1022(3) are not conveyed via link 1060(A). Spanning tree 1010C prevents packets that enter via network device 1022(3) from looping.

Figure 10D:
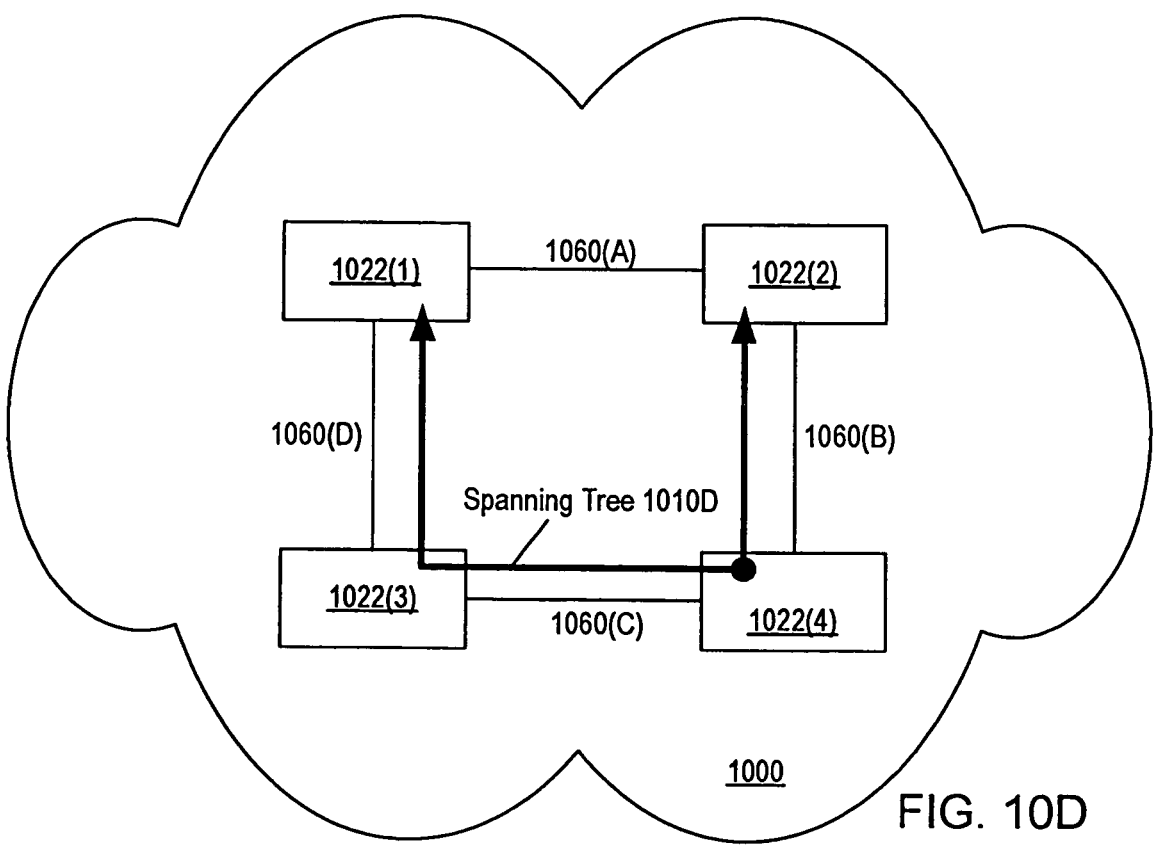

FIG. 10D illustrates spanning tree 1010D, which is used to convey packets that enter network 1000 via network device 1022(4). Network device 1022(4) is the root of spanning tree 1010D. Packets entering via network device 1022(4) are allowed to be forwarded to network device 1022(3) via link 1060(C), to network device 1022(2) via link 1060(B), and to network device 1022(1) via links 1060(C) and 1060(D). However, packets that entered network 1000 via network device 1022(4) are not conveyed via link 1060(A). Spanning tree 1010D prevents packets that enter via network device 1022(4) from looping within network 1000.

In a network that implements multiple spanning trees, the entity (or entities) that calculate the spanning trees is aware of the topology of the network. For example, one of network devices 1022(1)-1022(4) can be designated as the "primary" network device, for purposes of spanning tree calculation. The primary network device maintains information identifying the links and network devices within network 1000, as well as information identifying how the links and network devices are interconnected. This information provides the primary network device with knowledge about the topology of network 1000. In one embodiment, this information is provided to the primary network device as part of the primary network device's participation in a protocol that provides for the authentication of every network device included within the network.

The primary network device calculates a spanning tree for different ingress points into network 1000 based on the primary network device's knowledge of the topology of network 1000. The primary network device then provides information (such as egress filter settings) that is consistent with the calculated spanning trees to each other network device. The other network devices use the information to forward packets in a manner that is consistent with the spanning trees.

It is noted that in other embodiments, the spanning tree calculations are distributed among several network devices, instead of being performed by a single primary network device. For example, each network device that presents an ingress point into the network can calculate one of the spanning trees for the network (e.g., by running the spanning tree protocol with that network device as the root). In such embodiments, the calculation of egress filter settings can also be distributed among the network devices.

Additionally, each network device within network 1000 that presents an ingress point into network 1000 is assigned a unique identifier (or several unique identifiers). Packets received via a particular ingress point are associated with the unique identifier (or one of the unique identifiers) of that particular ingress point. For example, as described above, a header can be appended to each packet that enters network 1000. Alternatively, the unique identifier can be associated with the packet by inserting the unique identifier into a particular Ethertype (Ethernet Type) field of an L2 header appended to the packet, by inserting the unique identifier into a Multiprotocol Label Switching (MPLS) label appended to the packet, or by using another similar mechanism.

The header contains information identifying the ingress point of the packet. Additionally, whenever a packet is received via one of links 1060(A)-1060(D), network devices 1022(1)-1022(4) associate that source address of the packet with the ingress point (or with an interface within the ingress point) instead of associating the source address with the interface coupled to the link via which the packet is received. For example, network device 1022(2) receives a packet via link 1060(A). The header appended to the packet indicates that the packet entered network 1000 via interface 1 of network device 1022(1). Accordingly, network device 1022(2) associates the source address of the packet with network device 1022(1) (or with interface 1) instead of associating the packet with the interface within network device 1022(2) that is coupled to link 1060(A). If network device 1022(2) subsequently receives a packet addressed to that address, network device 1022(2) will forward the subsequently received packet based on the association.

Figure 11A:
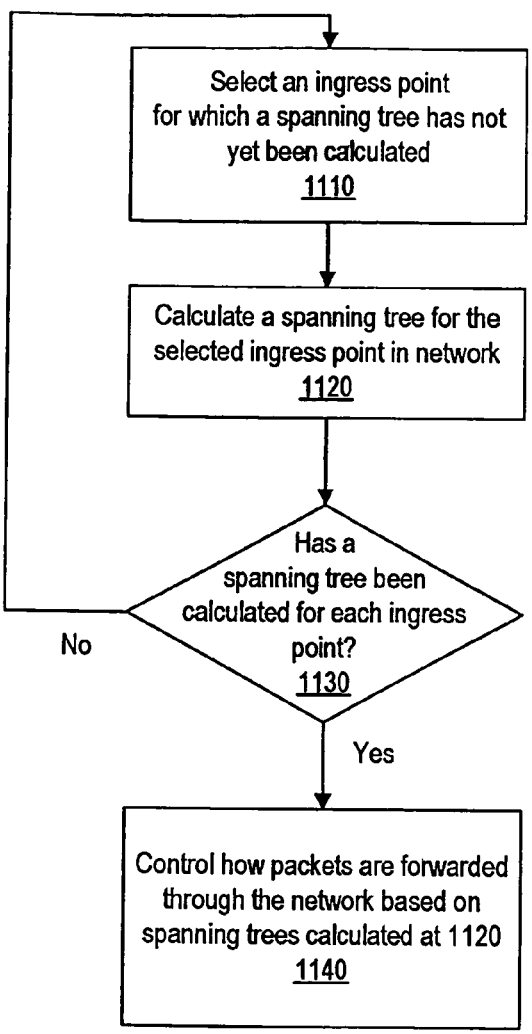
FIG. 11A shows a method of calculating a spanning tree for each ingress point, according to one embodiment of the present invention.

FIG. 11A shows a method of calculating a spanning tree for each ingress point within a network and using the calculated spanning trees to handle how packets are forwarded through the network. The network can be any association of interconnected network devices. In one embodiment, the network is a Layer 2 Ethernet network. In another embodiment, the network is a virtual network device cluster.

In the example of FIG. 11A, one spanning tree is calculated per ingress point within the network. An ingress point is a network device via which a packet enters the network (i.e., for a given packet, the packet's ingress point is the first network device within the network to receive the packet). At 1110, an ingress point for which a spanning tree has not yet been calculated is selected. Then, a spanning tree is calculated for the selected ingress point, as shown at 1120. The root of the spanning tree is the selected ingress point. If a spanning tree has not yet been calculated for each ingress point in the network, as determined at 1130, another ingress point is selected and functions 1110 and 1120 are repeated for the new ingress point.

At 1140, the manner in which packets are forwarded through the network is controlled, based on spanning trees calculated at 1120. Controlling how packets are forwarded through the network based on the spanning trees can involve generating a set of egress filter values for each interface within the network. Each set of egress filter values is provided to the appropriate interface, and each interface uses the provided set of egress filter values to filter packets from the packet flow being sent via that interface. A set of egress filter values indicates which packets are allowed to be sent via a particular interface. In particular, the egress filter values indicate whether a packet, which entered the network via a particular ingress point, is allowed to be sent via a particular interface. If the egress filter values for a particular interface indicate that packets having a certain ingress point should not be output from that interface, the interface will filter packets received via that ingress point from the packet flow being output via the interface.

Figure 11B:
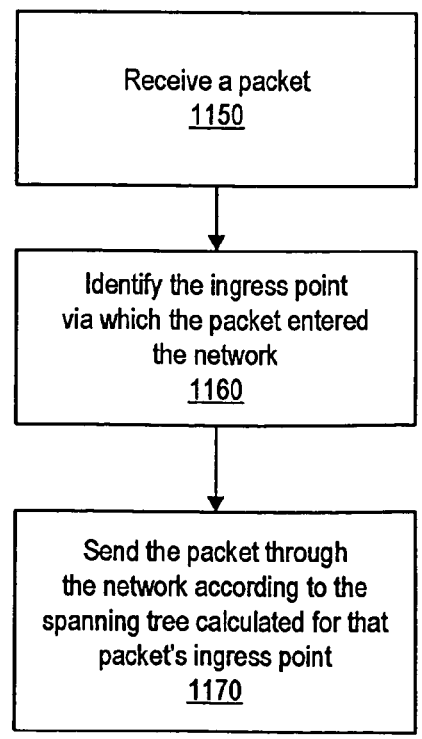
FIG. 11B shows the manner in which a packet is forwarded according to the spanning tree associated with a particular ingress point, according to one embodiment of the present invention.

FIG. 11B shows the manner in which a packet is forwarded according to the spanning tree associated with a particular ingress point. At 1150, a packet is received. The packet is associated with information identifying a particular ingress point. For example, a header, which includes information identifying the ingress point via which the packet entered the network, is appended to the packet in some embodiments. The associated information is used to identify the ingress point via which the packet entered the network, as shown at 1160.

At 1170, the packet is sent through the network according to the spanning tree associated with the ingress point identified at 1160. Sending the packet through the network according to a particular spanning tree can involve inhibiting the packet from being output via certain interfaces while allowing the packet to be output from other interfaces, such that the packet is only sent on paths that are consistent with the spanning tree. In some embodiments, egress filter values, as described above, are used to inhibit packets from being output via particular interfaces by filtering those packets from output flows being sent via the particular interfaces.

Each network device within a network that implements multiple spanning trees can include one or more interfaces that are similar to interface 600 of FIG. 6C. For example, in one embodiment, each interface includes a filtering unit and an egress filter values store coupled to the filtering unit. The egress filter values store stores several egress filter values, each of which identifies whether the interface is blocked by a respective one of the spanning trees. For example, the egress filter values in the egress filter values store can identify whether the interface is blocked by a first spanning tree, which is associated with a first ingress point, and whether the interface is blocked by a second spanning tree, which is associated with a second ingress point.

It is noted that in some embodiments, the functionality needed to operate a virtual network device sub-unit as part of a virtual network device cluster is implemented in software executing on the virtual network device sub-unit. For example, each virtual network device sub-unit, network device, and/or adjunct network device can include a computer readable media upon which program instructions and/or data useable to control and/or use a virtual link bundle are stored. Similarly, the functionality needed to operate a network device (or virtual network device sub-unit) as part of a network (or virtual network device cluster) that implements multiple spanning trees can be implemented in software executing on each network device. For example, a primary network device within the network can include a computer readable media upon which are stored program instructions useable to calculate multiple spanning trees and egress filter values corresponding to the multiple spanning trees. Exemplary types of computer readable media include CDs (Compact Discs), DVDs (Digital Versatile Discs), hard disks, optical disks, tape devices, floppy disks, and memory (e.g., various types of RAM (Random Access Memory), ROM (Read Only Memory), flash memory, MEMS (Micro Electro-Mechanical Systems) memory, and the like). Such a network device can include one or more processors (e.g., microprocessors, PLDs (Programmable Logic Devices), or ASICs (Application Specific Integrated Circuits)) configured to execute program instructions stored in the computer readable media. The program instructions can include those used to perform control protocol processing for a virtual link bundle as well as those used to selectively forward packets via links included in a virtual link bundle (e.g., based on whether the packets were received via a virtual network device link). The program instructions and/or data can also be transferred to a virtual network device sub-unit, network device, and/or adjunct network device via a network such as the Internet or upon a carrier medium.

Although the present invention has been described with respect to specific embodiments thereof, various changes and modifications may be suggested to one skilled in the art. It is intended such changes and modifications fall within the scope of the appended claims.

What is claimed is:

1. A method comprising:
accessing information appended to a packet, wherein the information identifies the first network device;
sending the packet through the network,
   wherein the sending is consistent with a first spanning tree if the packet was received into the network by the first network device is a first ingress point of the network,
   wherein the sending is consistent with a second spanning tree if the packet was received into the network by the first network device is a second ingress point of the network,
   wherein the sending comprises accessing an egress filter comprising a first setting based on the first spanning tree and a second setting based on the second spanning tree, and
   wherein the sending is performed by a second network device coupled to the first network device by at least one link.

2. The method of claim 1, wherein each of a plurality of spanning trees is associated with a respective one of a plurality of ingress points, and wherein packets received via different ones of the ingress points are sent through the network according to different ones of the spanning trees.

3. The method of claim 2, wherein each of the ingress points is a virtual network device sub-unit, and wherein the network is a virtual network device cluster.

4. The method of claim 2, further comprising: calculating the plurality of spanning trees.

5. The method of claim 4, wherein each of the ingress points calculates a respective one of the spanning trees.

6. The method of claim 4, wherein the calculating is performed by a primary network device.

7. The method of claim 6, further comprising: maintaining information identifying the topology of the network, wherein the calculating the plurality of spanning trees comprises accessing the information identifying the topology of the network.

8. The method of claim 6, further comprising: providing information that is consistent with the plurality of spanning trees to a plurality of secondary network devices.

9. The method of claim 8, wherein the information comprises an egress filter setting for each interface of each of the secondary network devices.

10. The method of claim 2, further comprising: associating the packet with the information.

11. The method of claim 10, further comprising: sending the packet and the identifier from the second network device to a third network device, wherein the network comprises the second network device and the third network device.

12. The method of claim 10, wherein the associating the packet with the identifier comprises: including the identifier in a header appended to the packet.

13. The method of claim 10, further comprising: associating a source address of the packet with the ingress point identified by the identifier.

14. A method comprising:
forwarding a packet to a first interface; accessing information appended to the packet, wherein the information identifies the first network device; outputting the packet from the first interface, if the first network device is a first ingress point of the network; and filtering the packet from a packet flow being output via the first interface, if the first network device is a second ingress point of the network, wherein the filtering comprises accessing an egress filter, wherein the egress filter comprises a first setting based on a first spanning tree and a second setting based on a second spanning tree, wherein the first spanning tree is associated with the first ingress point, wherein the second spanning tree is associated with the second ingress point, and wherein the outputting and the filtering are performed by a second network device coupled to the first network device by at least one link.

15. The method of claim 14, wherein the first interface is not blocked by the first spanning tree, and wherein the first interface is blocked by the second spanning tree.

16. The method of claim 15, wherein the information comprises an identifier of the first network device.

17. The method of claim 16, wherein a header is appended to the packet, and wherein the header comprises the identifier.

18. The method of claim 17, further comprising: associating a source address of the packet with the ingress point identified by the identifier.

19. The method of claim 16, wherein the egress filter indicates whether packets associated with the identifier can be output via the interface.

20. A system comprising:
a plurality of network devices comprising: a first network device; and a second network device, wherein the first network device is a first ingress point into a network and associated with a first spanning tree, wherein the second network device is a second ingress point into the network and associated with a second spanning tree, wherein the network devices are configured to access information appended to a packet, wherein the information identifies an ingress network device that received the packet into the network by the ingress network device, wherein the network devices are configured to send packets according to the first spanning tree, if the ingress network device is the first network device, wherein the network devices are configured to send packets according to the second spanning tree, if the ingress network device is the second network device, wherein the network devices are coupled to each other by at least one link and wherein each of the network devices is configured to access a respective one of a plurality of egress filters, wherein each of the plurality of egress filters comprises a first setting based on the first spanning tree and a second setting based on the second spanning tree.

21. The system of claim 20, wherein a one of the network devices is configured to associate a first packet with the first network device, in response to the first packet being received into the network by the first network device.

22. The system of claim 21, wherein the one of the network devices is the first network device.

23. The system of claim 21, wherein the one of the network devices is configured to associate the first packet with the first network device by including a value identifying the first network device in a header appended to the first packet.

24. The system of claim 23, wherein a second one of the network devices is configured to associate a source address of the first packet with the first network device, in response to receiving the packet and the header appended to the packet.

25. The system of claim 21, wherein the first network device is a root of the first spanning tree, and wherein the second network device is a root of the second spanning tree.

26. The system of claim 21, wherein the first network device is configured to calculate a plurality of spanning trees, the spanning trees comprising the first spanning tree and the second spanning tree, and wherein the first network device is configured to send information corresponding to the spanning trees to each other one of the network devices.

27. The system of claim 26, wherein the information corresponding to the spanning trees comprises an egress filter value.

28. A network device comprising: an interface, the interface comprising: a filtering unit, wherein the filtering unit is configured to access information appended to a packet, wherein the information identifies the first network device, and wherein the interface is coupled to the first network device by at least one link; and an egress filter values store coupled to the filtering unit, wherein the egress filter values store comprises a plurality of egress filter values, wherein a first egress filter value is based on a first spanning tree and a second egress filter value is based on a second spanning tree, wherein the first spanning tree is associated with a first ingress point, wherein the second spanning tree is associated with a second ingress point, wherein the egress filter values identify that the interface is not blocked if the first network device is the first ingress point, and wherein the egress filter values identify that the interface is blocked if packet was received by the first network device is the second ingress point.

29. The network device of claim 28, wherein the interface is not blocked by the first spanning tree, the interface is blocked by the second spanning tree.

30. The network device of claim 29, wherein the information comprises an identifier of the first network device.

31. The network device of claim 30, wherein the identifier is comprised in a header appended to the packet.

32. The network device of claim 28, further comprising: an identifier unit; and an identifier value store coupled to the identifier unit.

33. The network device of claim 32, wherein the identifier value store stores a value identifying the first network device, and wherein the identifier unit is configured to include the value in a header appended to the packet, in response to the interface receiving the packet.

34. A system comprising:
means for forwarding a packet to a first interface;
means for accessing information appended to the packet, wherein the information identifies the first network device;
means for outputting the packet from the first interface, if the first network device is a first ingress point of the network; and
means for filtering the packet from a packet flow being output via the first interface, if the first network device is a second ingress point of the network,
wherein filtering comprises accessing an egress filter,
wherein the egress filter comprises a first setting based on a first spanning tree and a second setting based on a second spanning tree,
wherein the first spanning tree is associated with the first ingress point,
wherein the second spanning tree is associated with the second ingress point, and
wherein the first interface is coupled to the first network device by at least one link.

35. The system of claim 34, wherein the first interface is not blocked by the first spanning tree, and wherein the first interface is blocked by the second spanning tree.

36. The system of claim 35, wherein the information comprises an identifier of the first network device.

37. The system of claim 36, wherein a header is appended to the packet, and wherein the header comprises the identifier.

38. The system of claim 37, further comprising: means for associating a source address of the packet with an ingress point identified by the identifier.

39. The system of claim 36, wherein the egress filter indicates whether packets associated with the identifier can be output via the interface.

40. A computer readable storage media storing program instructions, wherein the program instructions are computer executable to:

forward a packet to a first interface;
access information appended to the packet, wherein the information identifies the first network device;
cause a second network device to output the packet from the first interface, if the first network device is a first ingress point of the network; and
cause the second network device to filter the packet from a packet flow being output via the first interface, if the first network device is a second ingress point of the network,
wherein the filtering comprises accessing an egress filter,
wherein the egress filter comprises a first setting based on a first spanning tree and a second setting based on a second spanning tree,
wherein the first spanning tree is associated with the first ingress point,
wherein the second spanning tree is associated with the second ingress point, and
wherein the second network device is coupled to the first network device by at least one link.

41. The computer readable storage media of claim 40, wherein the first interface is not blocked by the first spanning tree, the first interface is blocked by the second spanning tree.

42. The computer readable storage media of claim 41, wherein the information comprises an identifier of the first network device.

43. The computer readable storage media of claim 42, wherein a header is appended to the packet, and the header comprises the identifier.

44. The computer readable storage media of claim 43, the program instructions are further executable to: associate a source address of the packet with an ingress point identified by the identifier.

45. The computer readable storage media of claim 42, wherein the egress filter indicates whether packets associated with the identifier can be output via the interface.

* * * * *